United States Patent
Kim et al.

(10) Patent No.: US 9,160,421 B2
(45) Date of Patent: Oct. 13, 2015

(54) METHOD AND APPARATUS FOR CONTROLLING WIRELESS POWER TRANSMISSION AND RECEPTION, AND WIRELESS POWER TRANSMISSION SYSTEM

(75) Inventors: Nam Yun Kim, Seoul (KR); Sang Wook Kwon, Seongnam-si (KR); Yun Kwon Park, Dongducheon-si (KR); Eun Seok Park, Suwon-si (KR); Young Tack Hong, Seongnam-si (KR); Ki Young Kim, Yongin-si (KR); Young Ho Ryu, Yongin-si (KR); Dong Zo Kim, Yongin-si (KR); Jin Sung Choi, Gimpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 13/366,618

(22) Filed: Feb. 6, 2012

(65) Prior Publication Data

US 2012/0202435 A1 Aug. 9, 2012

(30) Foreign Application Priority Data

Feb. 7, 2011 (KR) ........................ 10-2011-0010526

(51) Int. Cl.
*H04B 1/00* (2006.01)
*H04B 7/00* (2006.01)
*H04B 5/00* (2006.01)
(52) U.S. Cl.
CPC ............ *H04B 5/0037* (2013.01); *H04B 5/0093* (2013.01)

(58) Field of Classification Search
CPC .. H04B 5/0037; H04B 5/0093; H04W 56/003
USPC .................................................. 455/69, 574
See application file for complete search history.

(56) References Cited

U.S. PATENT DOCUMENTS

| 6,311,081 | B1 * | 10/2001 | Northcutt et al. ............. 455/574 |
| 6,876,866 | B1 | 4/2005 | Ulupinar et al. |
| 2007/0058575 | A1 | 3/2007 | Kwon et al. |
| 2010/0007307 | A1 | 1/2010 | Baarman et al. |
| 2011/0019601 | A1 * | 1/2011 | Li et al. ........................ 370/311 |

FOREIGN PATENT DOCUMENTS

| JP | 2010-141966 A | 6/2010 |
| JP | 2010-158151 A | 7/2010 |

(Continued)

OTHER PUBLICATIONS

International Search Report issued on Sep. 25, 2012 in counterpart International Patent Application No. PCT/KR2012/000881 (3 pages, in English).

*Primary Examiner* — Eugene Yun
(74) *Attorney, Agent, or Firm* — NSIP Law

(57) ABSTRACT

Provided are a transmission system and a wireless power transmission and reception controlling method. According to an embodiment, a wireless power receiver may include: a target communication unit configured to receive, from a wireless power transmitter, a wake-up request signal and synchronization information with respect to wireless power transmission, and to transmit a response signal with respect to the wake-up request signal to the wireless power transmitter; a load path switch configured to activate based on timing information included in the synchronization information; and a target resonator configured to receive wireless power from a source resonator of the wireless power transmitter, when the load path switch is activated.

28 Claims, 19 Drawing Sheets

(56) References Cited

FOREIGN PATENT DOCUMENTS

| | | |
|---|---|---|
| JP | 2010-178473 A | 8/2010 |
| KR | 10-2009-0056546 A | 6/2009 |
| KR | 10-2009-0103749 A | 10/2009 |
| KR | 10-2010-0062416 A | 6/2010 |
| KR | 10-2010-0066339 | 6/2010 |
| WO | WO 2007/084716 A2 | 7/2007 |

* cited by examiner

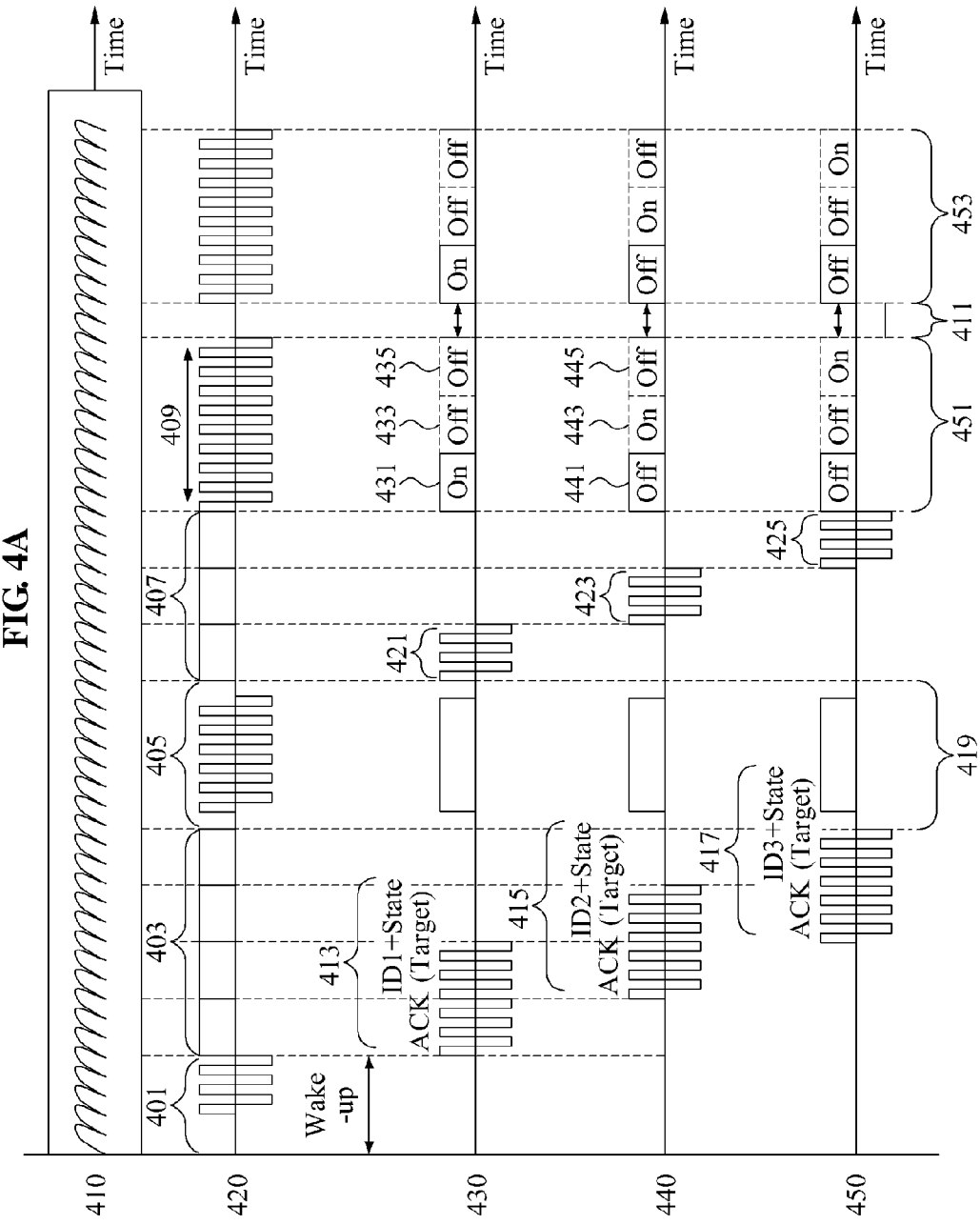

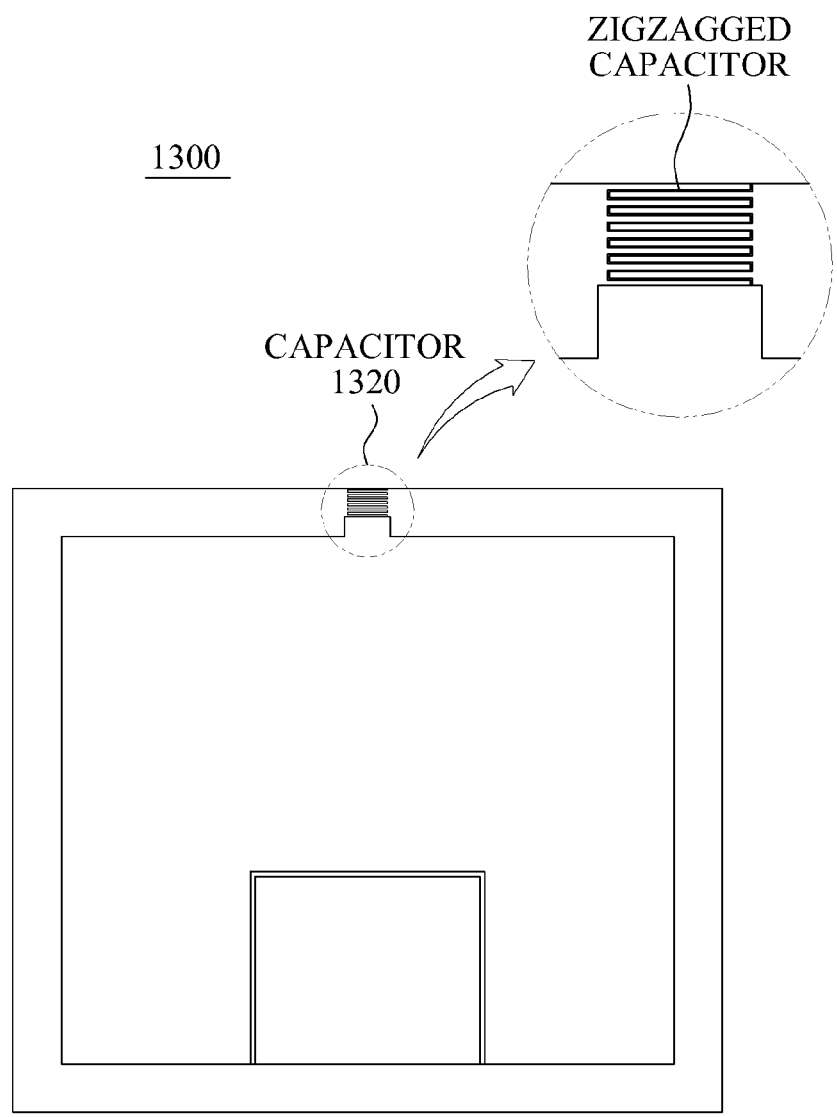

METHOD AND APPARATUS FOR CONTROLLING WIRELESS POWER TRANSMISSION AND RECEPTION, AND WIRELESS POWER TRANSMISSION SYSTEM

CROSS-REFERENCE TO RELATED APPLICATION(S)

This application claims the benefit under 35 U.S.C. §119(a) of Korean Patent Application No. 10-2011-0010526, filed on Feb. 7, 2011, in the Korean Intellectual Property Office, the entire disclosure of which is incorporated herein by reference for all purposes.

BACKGROUND

1. Field

The following description relates to a wireless power transmission and reception.

2. Description of Related Art

Wireless power may be energy transmitted from a wireless power transmitter to a wireless power receiver, for example, through a magnetic coupling. The wireless power transmission system may include a source electronic device that wirelessly transmits power and a target electronic device that wirelessly receives power. For example, the source electronic device may be referred to as the wireless power transmitter, and the target electronic device may be referred to as the wireless power receiver.

The source electronic device may include a source resonator, and the target electronic device may include a target resonator. The magnetic coupling or a resonance coupling may be positioned between the source resonator and the target resonator. The distance between the source resonator and the target resonator may vary over time, due to characteristics of a wireless environment, and/or a matching condition between the both resonators may also be changed.

SUMMARY

According to an aspect, a wireless power receiver may include: a target communication unit configured to receive, from a wireless power transmitter, a wake-up request signal and synchronization information with respect to wireless power transmission, and to transmit a response signal with respect to the wake-up request signal to the wireless power transmitter; a load path switch configured to activate based on timing information included in the synchronization information; and a target resonator configured to receive wireless power from a source resonator of the wireless power transmitter, when the load path switch is activated.

The response signal may include identification information associated with the wireless power receiver and information associated with a charge level.

The wireless power receiver may further include: a matching controller configured to perform an impedance matching between the target resonator and the load or between the source resonator and the target resonator.

The wireless power receiver may further include: a resonance switch that is included between the target resonator and the power supply and that is configured to activate based on the timing information included in the synchronization information.

The wireless power receiver may further include: a controller configured to calculate a power transmission efficiency of power wirelessly received from the wireless power transmitter, and to transmit the power transmission efficiency to the wireless power transmitter via the target communication unit.

The timing information included in the synchronization information may include information associated with timing sections allocated to each of a plurality of wireless power receivers; and the timing sections may be dynamically allocated based on a charge level of each of the plurality of wireless power receivers or based on a power transmission efficiency with respect to each of the plurality of wireless power receiver.

According to an aspect, a wireless power transmitter may include: a source communication unit configured to transmit, to a plurality of wireless power receivers, a wake-up request signal and synchronization information with respect to wireless power transmission, and to receive, from the plurality of power receivers, response signals with respect to the wake-up request signal; a power generating unit configured to generate power to be transmitted to the wireless power receivers; and a source resonator configured to wirelessly transmit the generated power to each of the plurality of target resonators.

The wireless power transmitter may further include: a controller configured to recognize a number of the wireless power receivers based on identification information included in each of the response signals, and to generate the synchronization information based on the number of the wireless power receivers.

The controller may be configured to monitor power transmission efficiency of the wirelessly transmitted power, and to adjust a resonance frequency of the source resonator based on a result of monitored power transmission efficiency.

The wireless power transmitter may further include: a matching controller configured to perform an impedance matching between the source resonator and the power generating unit.

Timing information included in the synchronization information may include information associated with timing sections allocated to each of the plurality of wireless power receivers; and the timing sections may be dynamically allocated based on a charge level of each of the plurality of wireless power receivers or based on a power transmission efficiency with respect to each of the plurality of wireless power receivers.

According to an aspect, a wireless power reception controlling method of a wireless power receiver may include: receiving a wake-up request signal from a wireless power transmitter; transmitting, to the wireless power transmitter, a response signal with respect to the wake-up request signal; receiving, from the wireless power transmitter, synchronization information with respect to wireless power transmission; and switching a connection to a load or a target resonator, based on timing information included in the synchronization information.

The response signal may include identification information of the wireless power receiver and information associated with a charge level.

The method may further include: detecting a reflected wave or a change in an impedance of the load, and controlling a resonance frequency or an impedance matching.

The timing information included in the synchronization information timing sections may be allocated to each of a plurality of wireless power receivers; and the timing sections may be dynamically allocated based on a charge level of each of the plurality of power receivers or based on a power transmission efficiency with respect to each of the plurality of wireless power receivers.

The target resonator may form a magnetic coupling with a source resonator when the connection of the load or the target resonator is switched.

According to an aspect, a wireless power transmission controlling method of a wireless power transmitter may include: broadcasting a wake-up request signal; receiving, from a plurality of wireless power receivers, response signals with respect to the broadcasted wake-up request signal; generating synchronization information to be used for wirelessly transmitting power to the plurality of wireless power receivers; broadcasting the synchronization information; and forming, based on timing information included in the synchronization information, a wireless connection with a target resonator of each of the plurality of wireless power receivers, and wirelessly transmitting power to each of the plurality of target resonators.

The generating of the synchronization information may include: determining a number of the wireless power receivers based on identification information included in each of the response signals, and generating the synchronization information based on the number of the wireless power receivers.

The timing information included in the synchronization information may include information associated with timing sections allocated to each of the plurality of wireless power receivers; and the timing sections may be dynamically allocated based on a charge level of each of the plurality of wireless power receivers or based on a power transmission efficiency of each of the plurality of wireless power receivers.

The timing information included in the synchronization information may be transmitted to each of the plurality of wireless power receivers based on a duty cycle time.

The duty cycle time may include: a power duty, a phase duty, or a frequency duty.

According to an aspect, a wireless power reception method may include: receiving a signal from a wireless power transmitter; transmitting, to the a wireless power transmitter, a response signal with respect to the received signal; receiving, from the wireless power transmitter, synchronization information used for wireless power reception.

The method may further include: switching a wireless connection to a load or a target resonator, based on the synchronization information.

The response signal includes identification information of the wireless power receiver, information associated with a charge level, or both.

Other features and aspects may be apparent from the following detailed description, the drawings, and the claims.

BRIEF DESCRIPTION OF THE DRAWINGS

FIG. 4A is a diagram illustrating operation timing of a source electronic device and target electronic devices in the environment of FIG. 3.

FIGS. 8 through 14 are diagrams illustrating a resonator.

Figure 1:
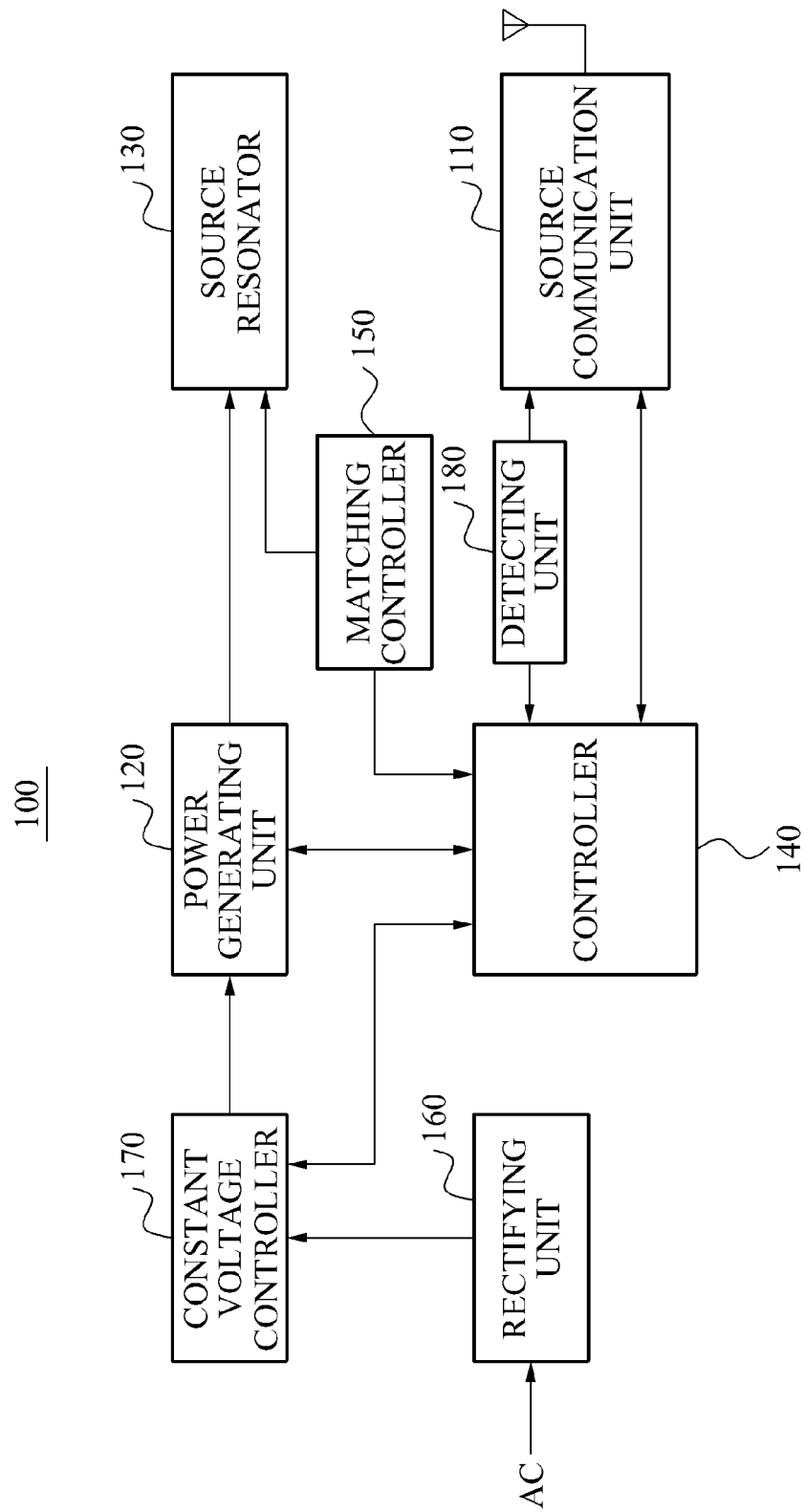
FIG. 1 is a diagram illustrating a wireless power transmitter.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 2:
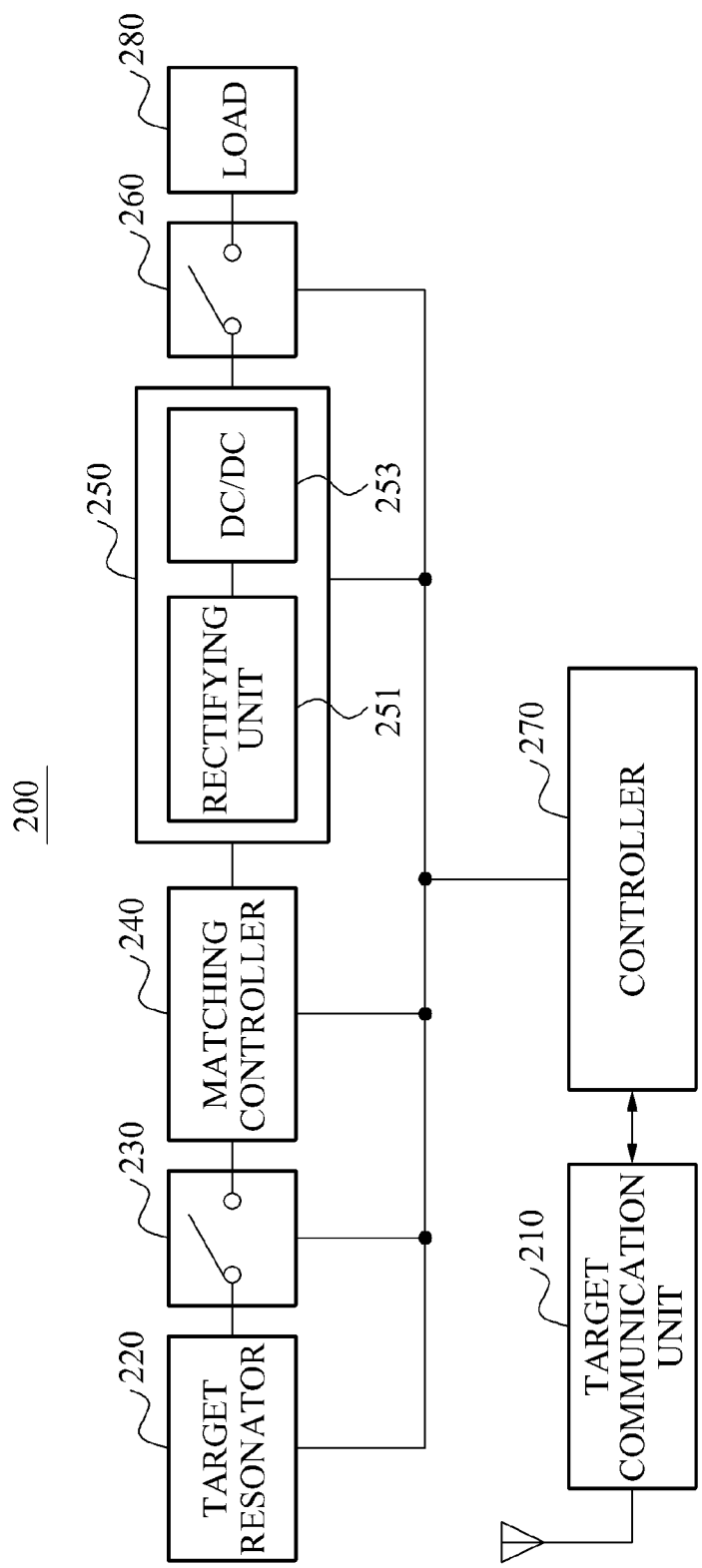
FIG. 2 is a diagram illustrating a wireless power receiver.
Figure 3:
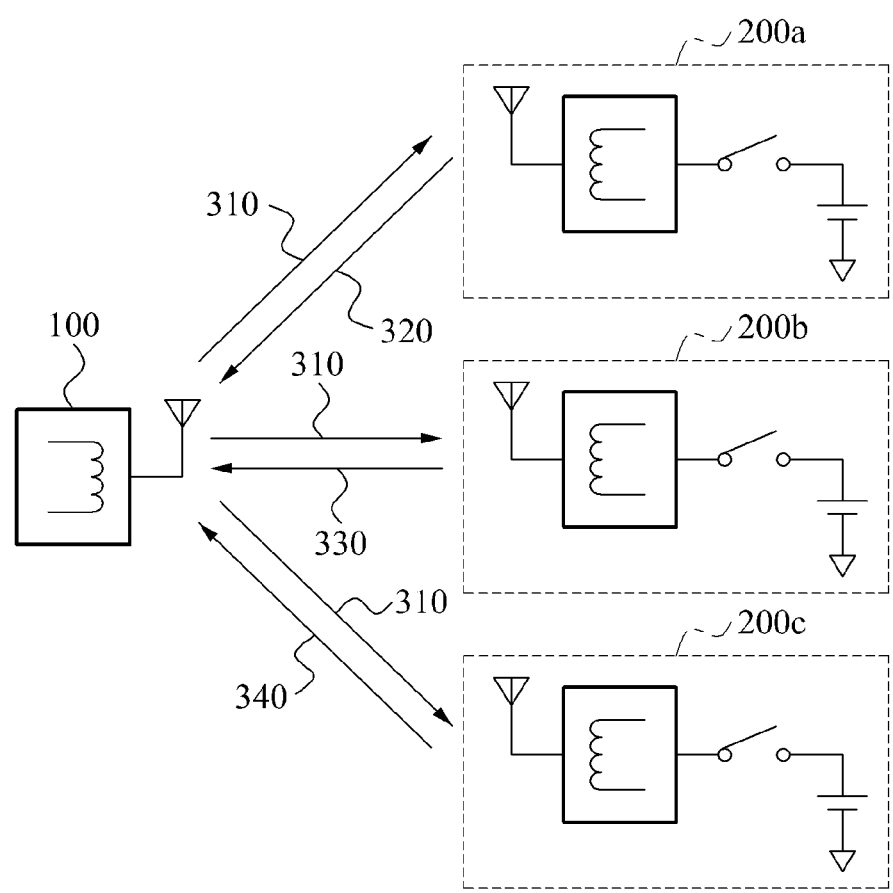
FIG. 3 is a diagram illustrating an environment where a plurality of target electronic devices exists.

Reference will be initially be made to FIGS. 1-3 in describing wireless power transmission and reception. FIG. 1 illustrates a wireless power transmitter 100. FIG. 2 illustrates a wireless power receiver 200. FIG. 3 illustrates an environment where a plurality of target electronic devices exists.

Referring to FIG. 1, the wireless power transmitter 100 may include a source communication unit 110, a power generating unit 120, a source resonator 130, and a controller 140. The wireless power transmitter 100 may further include a matching controller 150, a rectifying unit 160, a constant voltage controller 170, and a detecting unit 180.

Referring to FIG. 2, the wireless power receiver 200 may include a target communication unit 210, a target resonator 220, a load path switch 260, and a power supply 250. The wireless power receiver 200 may further include a resonance switch 230, a matching controller 240, and a controller 270.

Referring to FIG. 3, the wireless power transmitter 100 may transmit wireless power to one or more of a plurality of wireless power receivers, for example a first wireless power receiver 200a, a second wireless power receiver 200b, and a third wireless power receiver 200c, based on a time division scheme. The wireless power receivers may include target resonators, respectively, in some instances.

The source communication unit 110 of the wireless power transmitter 100 may be configured to transmit a wake-up request signal and information associated with wireless power transmission, to one or more of wireless power receivers 200a, 200b, and 200c. The source communication unit 110 may receive response signals with respect to the wake-up request signal from the plurality of wireless power receivers. In some embodiments, the source communication unit 110 may be configured to perform an in-band communication that performs transmission and reception of data with the wireless power receiver 200 through a resonance frequency, and may perform an out-band communication that performs transmission and reception of data with the wireless power receiver 200 through a frequency allocated for data communication. For example, the wake-up request signal may be a signal that requests identification information from electronic devices existing in wireless power transmission coverage area. The wireless power transmitter 100 may be configured to wirelessly transmit power of a predetermined level and may simultaneously transmit a wake-up signal and thus, may enable an electronic device that receives the wake-up signal to be converted to an activation mode. For example, synchronization information with respect to the wireless power transmission may include timing information to be used for turning a connection of a load or a connection of the target resonator, ON and OFF. The synchronization information will be described with reference to FIG. 4.

The power generating unit 120 of the wireless power transmitter 100 may be configured to generate power to be transmitted to the wireless power receivers. The power generating unit 120 may generate power based on a control of the controller 140. The power generating unit 120 may generate power by converting a direct current (DC) of a predetermined level into an alternating current (AC) based on a switching pulse signal of several megahertz (MHz) to several dozens of frequency bandwidths, for instance. Of course, other AC signals frequencies are also possible. Accordingly, the power generating unit 120 may include an AC/DC inverter. For example, DC power of a predetermined level may be provided from the constant voltage controller 170. In some implementations, the AC/DC inverter may further include a switching device for high-speed switching. For example, the switching device may be turned ON when the switching pulse signal is 'high' and may be turned OFF when the switching pulse signal is 'low.'

The switches or switch elements of the switching device may include various electromechanical switches (e.g., contact, toggle, knife, tilt, or the like) or electrical switches (e.g., solenoid, relays, or solid-state elements such as a transistor switch, silicon-controlled rectifier or a triac). Of course, other types of switches are also possible. In various embodiments, the switch may be configured to activate. For example, the switches may select between ON and OFF positions, which permit and prevent the flow of electricity (power), respectively. Accordingly, the switches control may control electrical connection.

The power generating unit 120 may also generate, based on the control of the controller 140, power that varies in each of timing sections of which resonance frequencies are predetermined. Also, the power generating unit 120 may generate power using a resonance frequency having optimal transmission efficiency, based on the control of the controller 140. Therefore, the source resonator 130 may wirelessly transmit, to the wireless power receiver 200, the power generated using the resonance frequency having the best power transmission efficiency.

The source resonator 130 of the wireless power transmitter 100 may be configured to transfer electromagnetic energy to a target resonator 220. The source resonator 130 may transfer, to the wireless power receiver 200, a resonance power through a magnetic coupling with the target resonator 220. For example, the source resonator 130 may be configured to resonate within a predetermined resonance bandwidth. In one or more embodiments, the source resonator 130 may form a magnetic coupling with a target resonator of each of the plurality of wireless power receivers, and may wirelessly transmit the generated power to the plurality of target resonators.

The controller 140 of the wireless power transmitter 100 may be configured to recognize a number of the wireless power receivers based on identification information included in each of the response signals, and may generate the synchronization information based on the number of wireless power receivers. The controller 140 may perform monitoring of a power transmission efficiency, of wirelessly transmitted power, and may adjust a resonance frequency of the source resonator 130 based on a result of the monitoring of the power transmission efficiency. For example, the information associated with the power transmission efficiency may be received from the wireless power receiver 200. The controller 140 may include at least one processor.

The matching controller 150 of the wireless power transmitter 100 may be configured to perform impedance matching between the source resonator 130 and the power generating unit 120. The matching controller 150 may adjust an impedance of the source resonator 130. That is, the matching controller 150 may adjust the impedance of the source resonator 130, based on a control of the controller 140.

The rectifying unit 160 may generate a DC voltage by rectifying an AC voltage of several dozens of frequency bandwidths, for instance.

The constant voltage controller 170 of the wireless power transmitter 100 may be configured to receive the DC voltage from the rectifying unit 160 and may output the DC voltage of a predetermined level based on a control of the controller 140. The constant voltage controller 170 may include a stabilization circuit to be used for outputting the DC voltage of the predetermined level.

The detecting unit 180 of the wireless power transmitter 100 may be configured to detect the wireless power receiver 200. The detecting unit 180 may detect the wireless power receiver 200 based on an identifier received from the power receiver 200. The wireless power receiver 200 may transmit the identifier to the wireless power transmitter 100 when reception of power is needed, and the detecting unit 180 may recognize that the wireless power receiver 200 exists when the identifier is received. When respective identifiers of the plurality of wireless power receivers are received, the detecting unit 180 may recognize each of the plurality of wireless power receivers.

The target communication unit 210 of the wireless power receiver 200 may be configured to receive, from the wireless power transmitter 100, the wake-up request signal and the synchronization information with respect to the wireless power transmission, and may transmit, to the wireless power transmitter 100, a response signal with respect to the wake-up request signal. For example, the response signal may include identification information associated with the wireless power receiver 200 and information associated with a charge level. The information associated with the charge level may include, for instance, information associated with an amount of power to be needed in the load or information associated with an amount of remaining current in a battery.

The target communication unit 210 may be configured to perform transmission and reception of data with the source communication unit 110 based on a control of the controller 270. The target communication unit 210 may transmit the identifier to the wireless power transmitter 100. The target communication unit 210 may be configured to receive information associated with an amount of power transmitted from the wireless power transmitter 100. The target communication unit 210 may be configured to transmit, to the wireless power transmitter 100, the information associated with the power transmission efficiency. The target communication unit 210 may be configured to perform an in-band communication and an out-band communication in the same manner as the source communication unit 110 of the wireless power transmitter 100.

The target communication unit 210 may be configured to transmit, the synchronization information associated with the wireless power transmission, to one or more other wireless power receivers, for example, the second wireless power receiver 200b and the third wireless power receiver 200c.

Therefore, the synchronization information with respect to the wireless power transmission may be shared by the plurality of wireless power transmitter, for example, the first wireless power receiver 200a, the second wireless power receiver 200b, and the third wireless power receiver 200c.

The target resonator 220 of the wireless power receiver 200 may be configured to form a magnetic coupling with the source resonator 130 of the wireless power transmitter 100 when a load path switch 260 is turned ON. The switches or switch elements of the load path switch 260 may include various electromechanical switches (e.g., contact, toggle, knife, tilt, or the like) or electrical switches (e.g., solenoid, relays, or solid-state elements such as a transistor switch, silicon-controlled rectifier or a triac). Of course, other types of switches are also possible. In various embodiments, the switch may be configured to activate. For example, the switch may select between ON and OFF positions, which permit and prevent the flow of electricity (power), respectively. Accordingly, the switches control may control electrical connection. When the load path switch 260 is turned ON, a load 280 may be connected to the wireless power receiver 200 and thus, the target resonator 220 may electrically connect the magnetic coupling with the source resonator 130. When the load path switch 260 is turned OFF, the target resonator 220 may electrically deactivate or switch OFF the magnetic coupling from the source resonator 130. For example, the load 280 may be a battery, a circuit consuming power, or an external device that is detachable from the wireless power receiver 200.

The load path switch 260 of the wireless power receiver 200 may be configured to be turned ON and OFF based on timing information included in the synchronization information. The load path switch 260 may be turned ON and OFF based on a control of the controller 270. The controller 270 may control the load path switch 260 to be ON and OFF based on the timing information included in the synchronization information. The load path switch 260 may be randomly turned ON and OFF, as opposed to being turned ON and OFF based on the timing information, and may transmit power to the load 280.

The power supply 250 may be configured to provide, to the load 280, power wirelessly received from the wireless power transmitter. The power supply 250 may include a rectifying unit 251 that generates a DC voltage by rectifying an AC voltage, and a DC/DC converter 253 that generates a DC voltage to be used in the load 280 by adjusting a level of the DC voltage outputted from the rectifying unit 251.

The resonance switch 230 may be positioned between the target resonator 220 and the power supply 250. The resonance switch 230 may be turned ON and OFF based on the timing information included in the synchronization information. When the load path switch 260 is maintained as an ON state, the controller 270 may control the resonance switch 230 to be turned ON and OFF based on the timing information included in the synchronization information. The switches or switch elements of the resonance switch 230 may include various electromechanical switches (e.g., contact, toggle, knife, tilt, or the like) or electrical switches (e.g., solenoid, relays, or solid-state elements such as a transistor switch, silicon-controlled rectifier or a triac). Of course, other types of switches are also possible. In various embodiments, the switch may be configured to activate. For example, the switches may select between ON and OFF positions, which permit and prevent the flow of electricity (power), respectively. Accordingly, the switches control may control electrical connection.

The matching controller 240 may be configured to perform an impedance matching between the target resonator 220 and the load 280 or between the source resonator 130 and the target resonator 220. And the matching controller 240 may be configured to determine whether to perform the impedance matching by detecting a reflected wave or detecting a change in an impedance of the load 280.

The controller 270 may be configured to calculate a power transmission efficiency of power wirelessly received from the wireless power transmitter 100. When the wireless power transmitter 100 broadcasts an amount of transmitted power (Pt), the controller 270 may calculate the power transmission efficiency by calculating a ratio of Pt to an amount of received power (Pr). The controller 270 may periodically calculate the power transmission efficiency, and may transmit, to the wireless power transmitter 100, information associated with the power transmission efficiency using the target communication unit 210.

In some embodiments, the controller 270 may check a state of the load 280, and may inform the wireless power transmitter 100 that charging of the load 280 is completed when the charging is completed.

Referring to FIG. 3, the wireless power transmitter 100 may transmit a wake-up request signal to the plurality of wireless power receivers. As shown, this may include the first wireless power receiver 200a, the second wireless power receiver 200b, and the third wireless power receiver 200c, in operation 310.

In response to receiving the wake-up signal, the first wireless power receiver 200a may transmit a response signal to the wireless power transmitter 100, in operation 320. For example, the response signal may include identification information (ID 1) associated with the first wireless power receiver 200a. Therefore, the wireless power transmitter 100 may recognize that the first wireless power receiver 200a exists in the wireless power transmission coverage.

Similarly, in response receiving the wake-up signal, the second wireless power receiver 200b may transmit a response signal to the wireless power transmitter 100, in operation 330. For example, the response signal may include identification information (ID 2) associated with the second wireless power receiver 200b. Therefore, the wireless power transmitter 100 may recognize that the second wireless power receiver 200b exists in the wireless power transmission coverage.

And, in response receiving the wake-up signal, the third wireless power receiver 200c may transmit a response signal to the wireless power transmitter 100, in operation 340. For example, the response signal may include identification information (ID 3) associated with the third wireless power receiver 200c. Therefore, the wireless power transmitter 100 may recognize that the third wireless power receiver 200c exists in the wireless power transmission coverage.

Upon receiving the response signals from the first, second and third wireless power receivers 200a, 200b and 200c, the wireless power transmitter 100 may recognize that three target electronic devices exist in the wireless power transmission coverage, through operations 310 through 340. The wireless power transmitter 100 may then allocate time slots to be used for transmitting, based on a time-division scheme, power to the three target electronic devices. For example, the time slots may be timing information included in the synchronization information. One or more of the wireless power receivers may recognize the time slots for turning ON and OFF the connection to a load.

FIG. 4A illustrates operation timing of a source electronic device and target electronic devices in the environment of FIG. 3.

In FIG. 4A, a timing 410 may denote a wireless power transmission timing. The wireless power transmitter 100 may maintain a power transmission state in a timing section illustrated in FIG. 4A.

And a timing 420 may denote a data transmission timing of the wireless power transmitter 100. The wireless power transmitter 100 may broadcast a wake-up signal in a timing section 401. In a time section 403, the wireless power transmitter 100 may wait for a response signal with respect to the wake-up signal. The wireless power transmitter 100 may receive response signals from the wireless power receivers, for example, the first wireless power receiver 200a, the second wireless power receiver 200b, and the third wireless power receiver 200c, in the timing section 403. In a timing section 405, the wireless power transmitter 100 may broadcast synchronization information. Therefore, the wireless power receivers may receive the synchronization information in a timing section 419, respectively. In a timing section 407, the wireless power transmitter 100 may receive one or more acknowledgement (ACK) messages that indicate the synchronization information is received, from the respective wireless power receivers that receive the synchronization information. The wireless power transmitter 100 may periodically broadcast the wake-up signal in a timing section 409. The wireless power transmitter 100 may periodically perform the broadcasting, to determine whether a new target electronic device appears in the wireless power coverage.

A timing 430 may denote an operation timing of the first wireless power receiver 200a. In a timing section 413, the first wireless power transmitter 200a may transmit, to the wireless power transmitter 100, a response signal with respect to the wake-up signal. The first power receiver 200a may transmit, to the wireless power transmitter 100, an ACK message indicating that the synchronization information is successfully received, in a timing section 421. Examples of the timing information included in the synchronization information may include timing information 451, timing information 411, and timing information 453. In one or more embodiments, the timing information 451 may indicate that ID 1 may be turned on in a timing section 431 and may be turned OFF in timing sections 433 and 435. Therefore, the first wireless power receiver 200a may wirelessly receive power by turning on a connection to a load in the timing section 431.

A timing 440 may denote an operation timing of the second wireless power receiver 200b. The second wireless power receiver 200b may transmit, to the wireless power transmitter 100, a response signal with respect to the wake-up signal in a timing section 415. The second wireless power receiver 200b may transmit, to the wireless power transmitter 100, an ACK message indicating that the synchronization information is successfully received, in a timing section 423. For example, the timing information 451 may indicate that ID 2 may be turned OFF in timing sections 441 and 445 and may be turned on in a timing section 443. Therefore, the first wireless power receiver 200b may wirelessly receive power by turning ON the connection to the load in the timing section 443.

A timing 450 may denote an operation timing of the third wireless power receiver 200c. The third wireless power receiver 200c may transmit, to the wireless power transmitter 100, a response signal with respect to the wake-up signal, in a timing section 417. The third wireless power receiver 200c may transmit, to the wireless power transmitter 100, an ACK message indicating that the synchronization information is successfully received, in a timing section 425. The third wireless power receiver 200c may turn the connection to the load ON and OFF based on the timing information included in the synchronization information.

The timing information included in the synchronization information may include information associated with ON and OFF timing sections allocated to each of the plurality of wireless power receivers, as illustrated in FIG. 4A.

The ON and OFF timing sections allocated to each of the plurality of wireless power receivers may be allocated based on a charge level of each of the plurality of wireless power receivers or a power transmission efficiency with respect to each of the plurality of wireless power receivers. For example, when a power transmission efficiency of the first wireless power receiver 200a is higher than a power transmission efficiency of the second wireless power receiver 200b, the time section 431 may be set to be longer than the time section 433 or the time section 435. When a charge level of the first wireless power receiver 200a is lower than a charge level of the second wireless power receiver 200b, the time section 431 may also be set to be longer than the timing section 433 or the timing section 435. For example, the low charge level may indicate that an amount of power to be needed is relatively high.

Figure 4B:
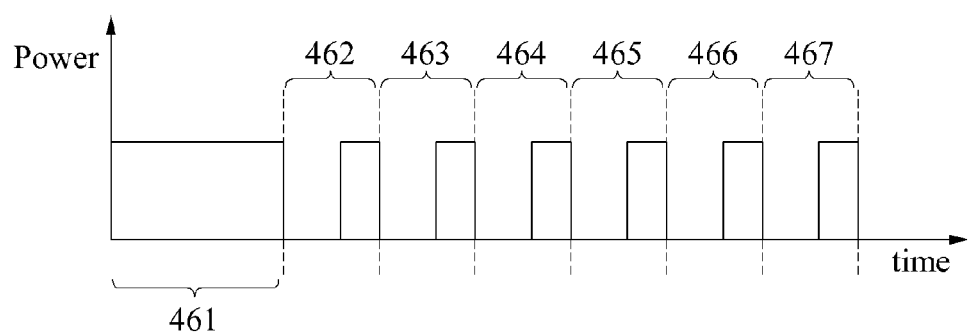
FIGS. 4B through 4D are diagrams illustrating a timing information transmission method.
Figure 4C:
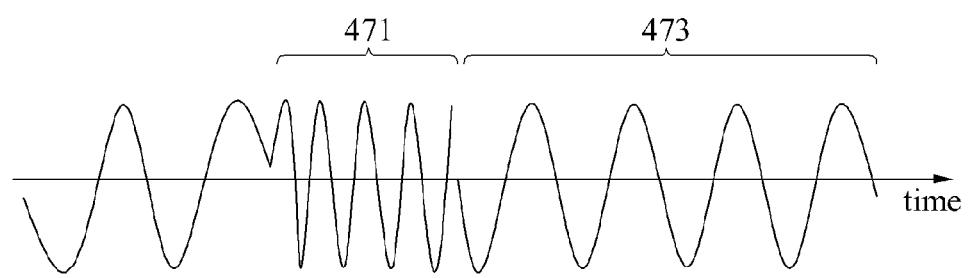
Figure 4D:
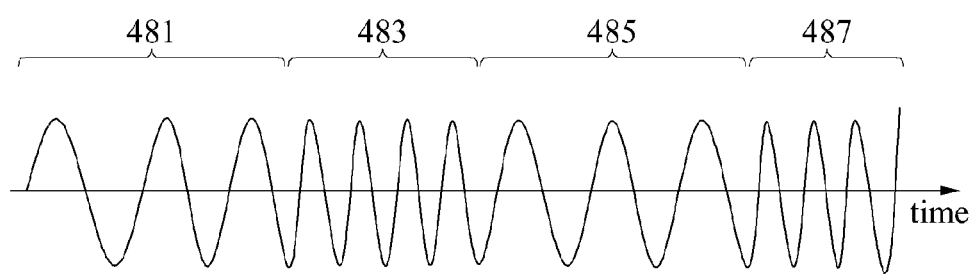

FIGS. 4B through 4D illustrate a timing information transmission method.

Referring to FIG. 4B through FIG. 4D, timing information included in synchronization information may be transferred to one or more of a plurality of wireless power receivers, for example, the first wireless power receiver 200a, the second wireless power receiver 200b, and the third wireless power receiver 200c, based on a duty cycle time. For example, a power duty of FIG. 4B, a phase duty of FIG. 4C, and a frequency duty of FIG. 4D may be used as the duty cycle time.

The wireless power transmitter 100 may broadcast a signal of FIG. 4B based on an in-band communication scheme. A timing section 461 may inform the plurality of power receivers that timing information of a synchronization signal is transmitted in the timing section 461. Timing sections 462 and 465 may denote time slots allocated to the first wireless power receiver 200a, time sections 463 and 466 may denote time slots allocated to the second wireless power receiver 200b, and timing sections 464 and 467 may denote time slots allocated to third wireless power receiver 200c.

The wireless power transmitter 100 may broadcast a signal of FIG. 4C based on the in-band communication scheme. The signal of FIG. 4C may have a phase varying based on a predetermined time unit. A timing section 471 may denote a time slot allocated to the first wireless power receiver 200a, and a timing section 473 may denote a time slot allocated to the second wireless power receiver 200b.

The wireless power transmitter 100 may broadcast a signal of FIG. 4D based on the in-band communication scheme. The signal of FIG. 4D may have a frequency varying based on a predetermined time unit. A timing section 481 may inform the plurality of wireless power receivers that the timing information of the synchronization signal is transmitted in the timing section 481. A timing section 483 may denote a time slot allocated to the first wireless power receiver 200a, a timing section 485 my denote a time slot allocated to the second wireless power receiver 200b, and a timing section 487 may denote a time slot allocated to the third wireless power receiver 200c. A timing section where a signal is not transmitted may be inserted between the timing section 483 and the timing section 485, or may be inserted between the time section 485 and the time section 487.

Figure 5:
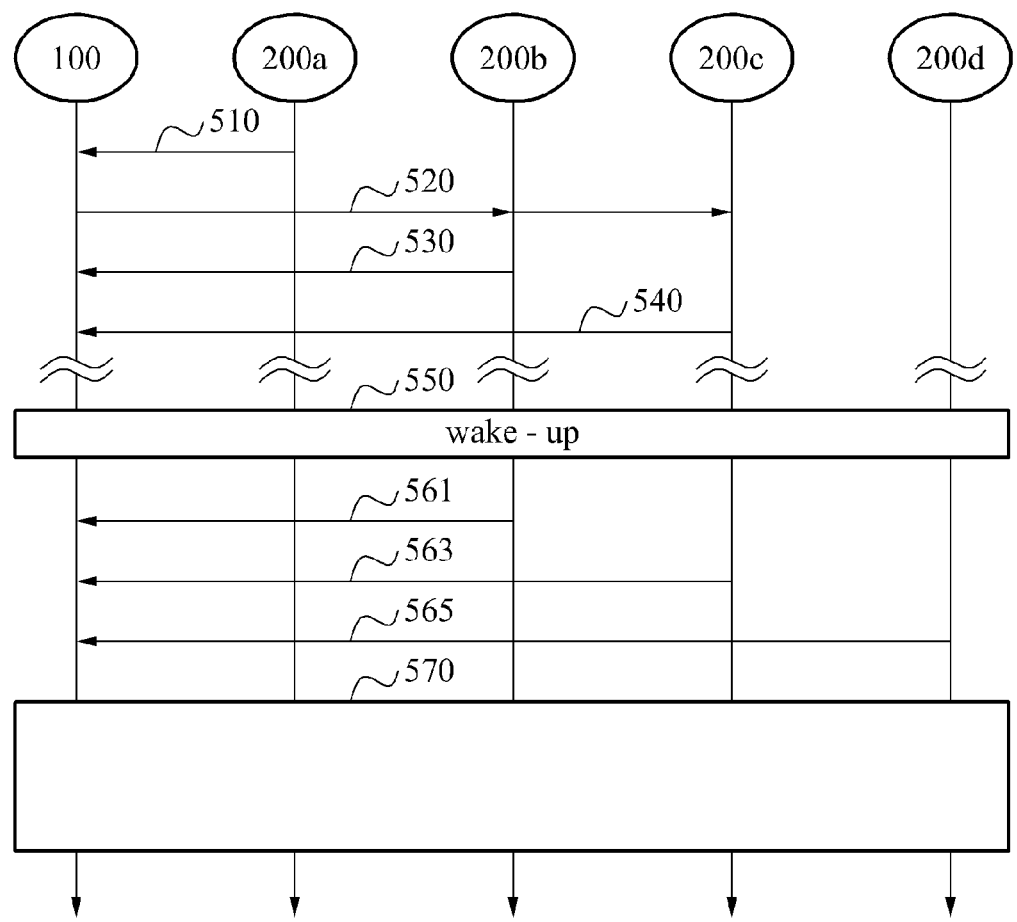
FIG. 5 is a diagram illustrating operations of a source electronic device and target electronic devices in the environment of FIG. 3.

FIG. 5 illustrates a source electronic device and target electronic devices in the environment of FIG. 3.

Referring to FIG. 5, the first wireless power receiver 200a may inform the wireless power transmitter 100 that reception of power may not be needed any longer. For example, when charging of a battery is completed or when a connection to a load is not needed, the reception of power may not be needed. The wireless power transmitter 100 may broadcast synchronization information for the two wireless power receivers, for example, the second wireless power receiver 200*b* and the third wireless power receiver 200*c*, in operation 520. For example, the synchronization information for the two wireless power receivers may include two time slots, as opposed to the timing section 451 of FIG. 4A. In operation 530, the second wireless power receiver 200*b* may transmit, to the wireless power transmitter 100, an ACK message indicating that synchronization information is successfully received. In operation 540, the third wireless power receiver 200*c* may transmit, to the wireless power transmitter 100, an ACK message indicating that the synchronization information is successfully received. After operation 540, each the two wireless power receivers may turn on the connection to the load in a corresponding time slot based on the synchronization information and thus, may wirelessly receive power.

After one wireless power transmission frame is completed, preparation to start a new wireless power transmission frame is performed in operation 550. In operation 550, the wireless power transmitter 100 may broadcast a wake-up signal. For example, it is assumed that a fourth wireless power receiver 200*d* newly appears in power transmission coverage of the wireless power transmitter 100.

Each of a plurality of wireless power receivers, for example, the second wireless power receiver 200*b*, the third wireless power receiver 200*c*, and the fourth wireless power receiver 200*d*, may transmit a response signal with respect to the wake-up signal to the wireless power transmitter 100. In operation 570, the wireless power transmitter 100 and the plurality of wireless power receivers may operate in the same manner as the description with respect to FIG. 4A.

Figure 6:
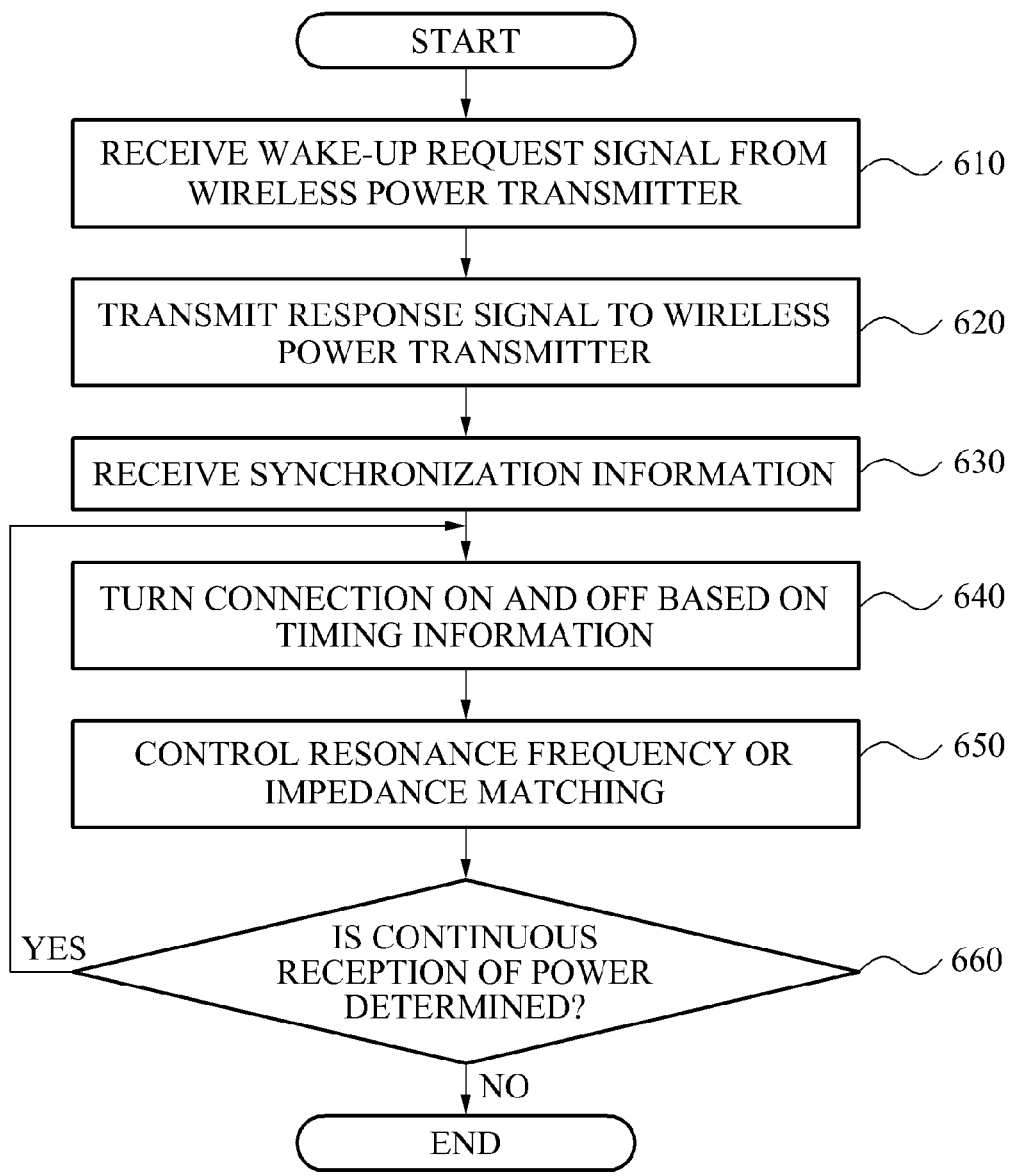
FIG. 6 is a flowchart illustrating a wireless power reception controlling method of a wireless power receiver.

FIG. 6 illustrates a wireless power reception controlling method of the wireless power receiver 200.

The wireless power reception controlling method may be performed by the wireless power receiver 200.

Referring to FIG. 6, the wireless power receiver 200 may receive a wake-up request signal from the wireless power transmitter 100 in operation 610.

The wireless power receiver 200 may transmit, to the wireless power transmitter 100, a response signal with respect to the wake-up request signal in operation 620.

The wireless power receiver 200 may receive, from the wireless power transmitter 100, synchronization information with respect to wireless power transmission, in operation 630.

The wireless power receiver 200 may turn a connection of a load or a connection of a target resonator ON and OFF, based on timing information included in the synchronization information in operation 640. When the connection of the load or the connection of the target resonator is turned ON, the target resonator 220 may form a magnetic coupling with a source resonator and thus, power may be wirelessly received.

The wireless power receiver 200 may detect a reflected wave or a change in impedance of the load, and may control a resonance frequency or impedance matching. In this example, when the reflected wave is detected, the wireless power receiver 200 may change the response frequency to a predetermined frequency, or may exchange a message with the wireless power transmitter 100 to change the resonance frequency. When the change in the impedance of the load is detected, the wireless power receiver 200 may perform the impedance matching by adjusting the impedance of the target resonator 220.

The wireless power receiver 200 may determine whether to continuously receive power in operation 660. When charging of a battery included in the load 280 is completed, the wireless power receiver 200 may determine that reception of power is not needed any longer. When the reception of power is continuously needed, the wireless power receiver 200 may perform operation 640 again. In some implementations, the wireless power receiver 200 may repeatedly perform a wireless power transmission frame based on an operation timing in the timing 430 of FIG. 4A.

Figure 7:
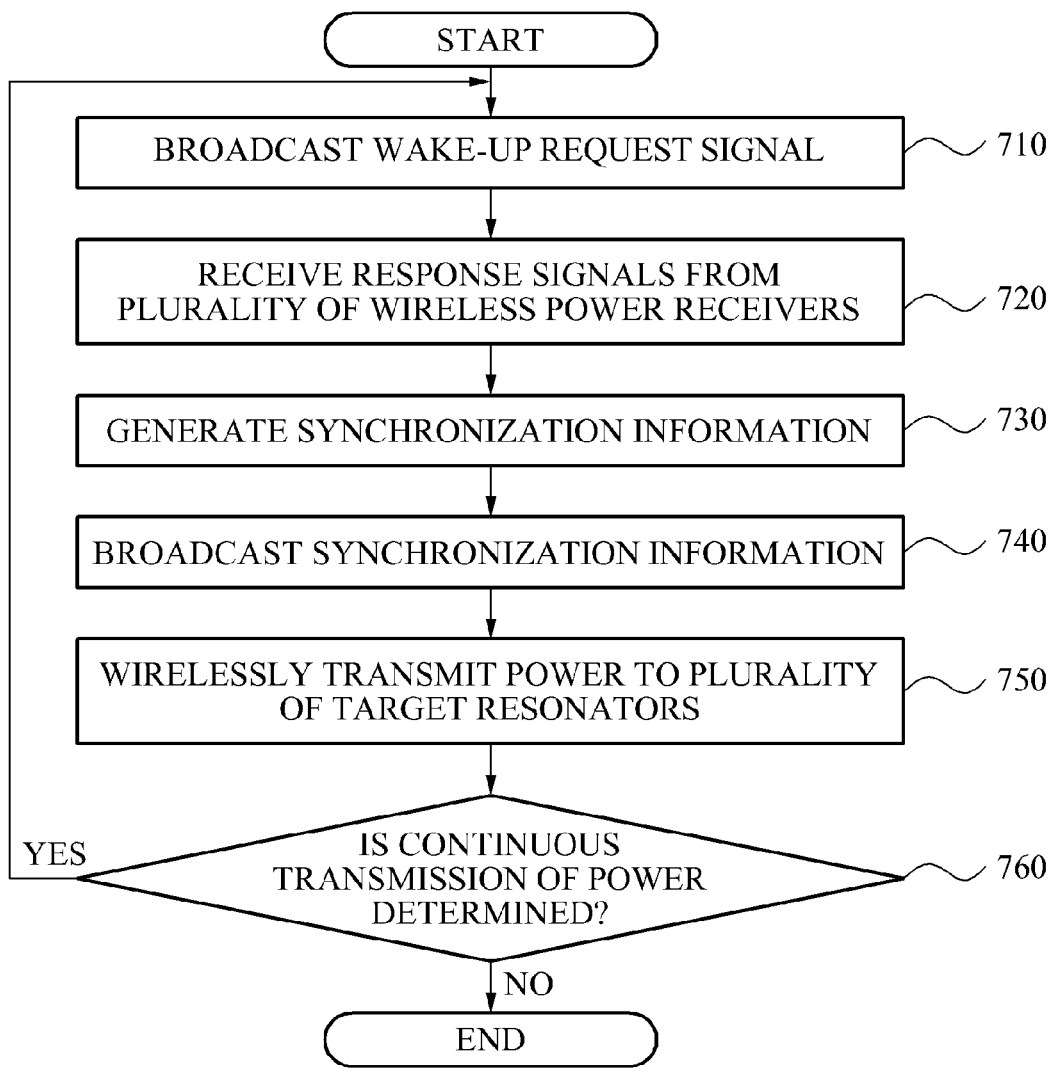
FIG. 7 is a flowchart illustrating a wireless power transmission controlling method of a wireless power transmitter.

FIG. 7 illustrates a wireless power transmission controlling method of the wireless power transmitter 100.

The wireless power transmission controlling method of FIG. 7 may be performed by the wireless power transmitter 100.

Referring to FIG. 7, the wireless power transmitter 100 may broadcast a wake-up signal in operation 710.

In operation 720, the wireless power transmitter 100 may receive response signals, with respect to the wake-up request signal, respectively from a plurality of wireless power receivers, for example, the first wireless power receiver 200*a*, the second wireless power receivers 200*b*, and the third wireless power receivers 200*c*.

The wireless power transmitter 100 may generate synchronization information to be used for wirelessly transmitting power to the plurality of wireless power receivers, in operation 730. For example, the wireless power transmitter 100 may recognize a number of the wireless power receivers based on identification information included in each of the response signals, and may generate the synchronization information based on the number of the wireless power receivers. And when the number of the wireless power receivers is three, three wireless power receivers may be allocated to a time slot, for instance.

The wireless power transmitter 100 may broadcast the synchronization information in operation 740.

The wireless power transmitter 100 may form a wireless connection (e.g., a magnetic coupling) with a target resonator of each of the plurality of wireless power receivers, based on timing information included in the synchronization information, in operation 750. The wireless power transmitter 100 may wirelessly transmit power to one or more of the plurality of target resonators in a time section where a corresponding wireless connection (i.e., magnetic coupling) is formed.

The wireless power transmitter 100 may determine whether to continuously transmit power in operation 760. When a target electronic device does not exist in power transmission coverage, of the wireless power transmitter 100, the wireless power transmitter 100 may determine that the power transmission is not needed any longer. When the wireless power transmission is continuously needed, the wireless power transmitter 100 may repeatedly perform operations 710 through 750, for instance.

A source resonator and/or a target resonator may be configured as a helix coil structured resonator, a spiral coil structured resonator, a meta-structured resonator, or the like.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

One or more of the materials of the embodiments disclosed herein may be metamaterials. The magnetic permeability may indicate a ratio between a magnetic flux density occurring with respect to a given magnetic field in a corresponding material and a magnetic flux density occurring with respect to the given magnetic field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area, for instance.

FIG. 8 through FIG. 14 illustrate various embodiments of a resonator. Although, it will be appreciated that other source resonator configurations are also possible.

Figure 8:
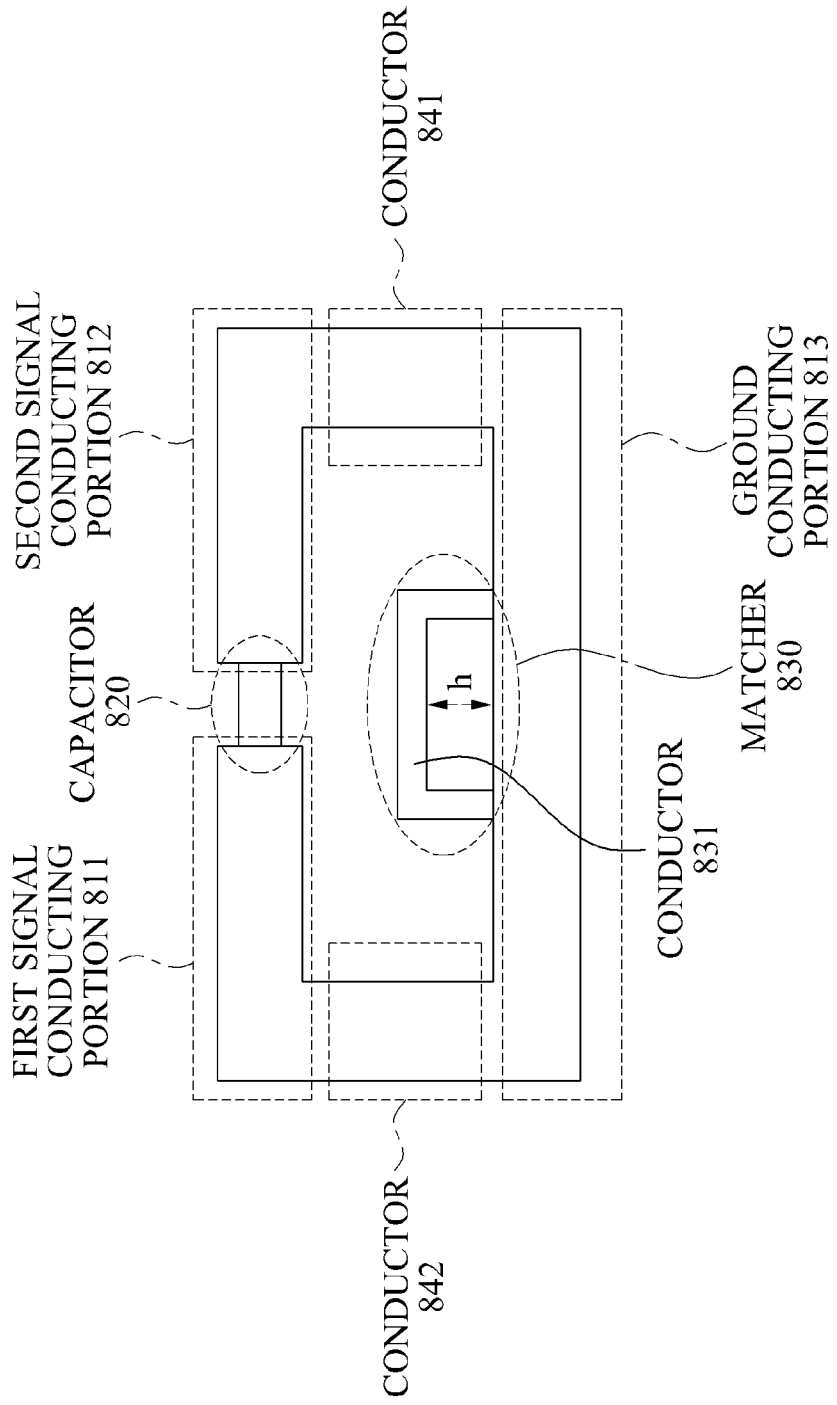

FIG. 8 illustrates a resonator 800 having a two-dimensional (2D) structure.

As shown, the resonator 800 having the 2D structure may include a transmission line, a capacitor 820, a matcher 830, and conductors 841 and 842. The transmission line may include, for instance, a first signal conducting portion 811, a second signal conducting portion 812, and a ground conducting portion 813.

The capacitor 820 may be inserted or otherwise positioned in series between the first signal conducting portion 811 and the second signal conducting portion 812 so that an electric field may be confined within the capacitor 820. In various implementations, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. As shown in FIG. 8, the resonator 800 may be configured to have a generally 2D structure. The transmission line may include the first signal conducting portion 811 and the second signal conducting portion 812 in the upper portion of the transmission line, and may include the ground conducting portion 813 in the lower portion of the transmission line. As shown, the first signal conducting portion 811 and the second signal conducting portion 812 may be disposed to face the ground conducting portion 813 with current flowing through the first signal conducting portion 811 and the second signal conducting portion 812.

In some implementations, one end of the first signal conducting portion 811 may be electrically connected (i.e., shorted) to a conductor 842, and another end of the first signal conducting portion 811 may be connected to the capacitor 820. And one end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other, such that the resonator 800 may have an electrically "closed-loop structure." The term "closed-loop structure" as used herein, may include a polygonal structure, for example, a circular structure, a rectangular structure, or the like that is electrically closed. The capacitor 820 may be inserted into an intermediate portion of the transmission line. For example, the capacitor 820 may be inserted into a space between the first signal conducting portion 811 and the second signal conducting portion 812. The capacitor 820 may be configured, in some instances, as a lumped element, a distributed element, or the like. In one implementation, a distributed capacitor may be configured as a distributed element and may include zigzagged conductor lines and a dielectric material having a relatively high permittivity between the zigzagged conductor lines.

When the capacitor 820 is inserted into the transmission line, the resonator 800 may have a property of a metamaterial, as discussed above. For example, the resonator 800 may have a negative magnetic permeability due to the capacitance of the capacitor 820. If so, the resonator 800 may be referred to as a mu negative (MNG) resonator. Various criteria may be applied to determine the capacitance of the capacitor 820. For example, the various criteria for enabling the resonator 800 to have the characteristic of the metamaterial may include one or more of the following: a criterion for enabling the resonator 800 to have a negative magnetic permeability in a target frequency, a criterion for enabling the resonator 800 to have a zeroth order resonance characteristic in the target frequency, or the like. The resonator 800, also referred to as the MNG resonator 800, may also have a zeroth order resonance characteristic (i.e., having, as a resonance frequency, a frequency when a propagation constant is "0"). If the resonator 800 has a zeroth order resonance characteristic, the resonance frequency may be independent with respect to a physical size of the MNG resonator 800. Moreover, by appropriately designing the capacitor 820, the MNG resonator 800 may sufficiently change the resonance frequency without substantially changing the physical size of the MNG resonator 800 may not be changed.

In a near field, for instance, the electric field may be concentrated on the capacitor 820 inserted into the transmission line. Accordingly, due to the capacitor 820, the magnetic field may become dominant in the near field. In one or more embodiments, the MNG resonator 800 may have a relatively high Q-factor using the capacitor 820 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 800 may include a matcher 830 for impedance-matching. For example, the matcher 830 may be configured to appropriately determine and adjust the strength of a magnetic field of the MNG resonator 800, for instance. Depending on the configuration, current may flow in the MNG resonator 800 via a connector, or may flow out from the MNG resonator 800 via the connector. The connector may be connected to the ground conducting portion 813 or the matcher 830. In some instances, power may be transferred through coupling without using a physical connection between the connector and the ground conducting portion 813 or the matcher 830.

As shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 for the impedance-matching positioned in a location that is separate from the ground conducting portion 813 by a distance h. Accordingly, the impedance of the resonator 800 may be changed by adjusting the distance h.

In some instances, a controller may be provided to control the matcher 830 which generates and transmits a control signal to the matcher 830 directing the matcher to change its physical shape so that the impedance of the resonator may be adjusted. For example, the distance h between a conductor 831 of the matcher 830 and the ground conducting portion 813 may be increased or decreased based on the control signal. The controller may generate the control signal based on various factors.

As shown in FIG. 8, the matcher 830 may be configured as a passive element such as the conductor 831, for example. Of course, in other embodiments, the matcher 830 may be configured as an active element such as a diode, a transistor, or the like. If the active element is included in the matcher 830, the active element may be driven based on the control signal generated by the controller, and the impedance of the resonator 800 may be adjusted based on the control signal. For example, when the active element is a diode included in the matcher 830, the impedance of the resonator 800 may be adjusted depending on whether the diode is in an ON state or in an OFF state.

In some instances, a magnetic core may be further provided to pass through the MNG resonator 800. The magnetic core may perform a function of increasing a power transmission distance.

Figure 9:
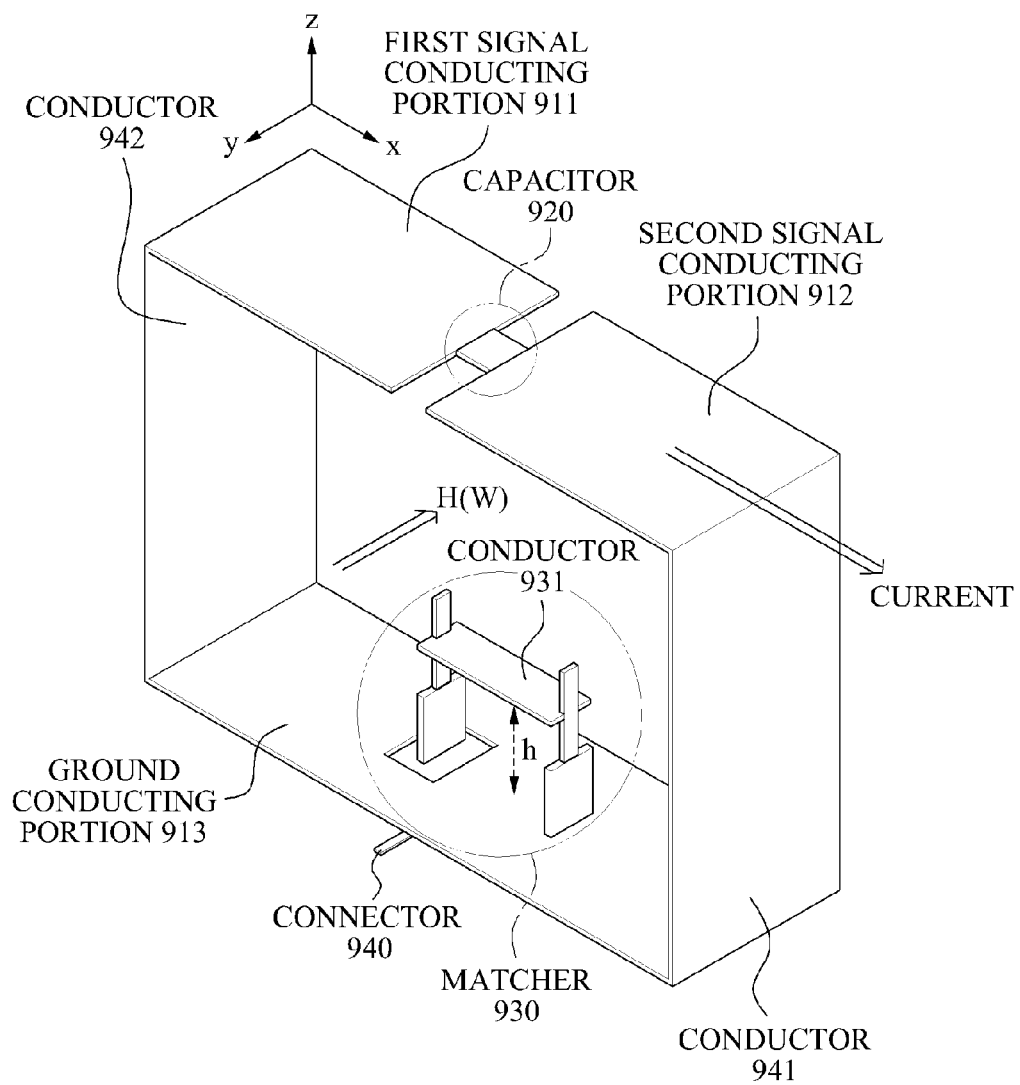

FIG. 9 illustrates a resonator 900 having a three-dimensional (3D) structure.

Referring to FIG. 9, the resonator 900 having the 3D structure may include a transmission line and a capacitor 920. The transmission line may include a first signal conducting portion 911, a second signal conducting portion 912, and a ground conducting portion 913. The capacitor 920 may be inserted, for instance, in series between the first signal conducting portion 911 and the second signal conducting portion 912 of the transmission link such that an electric field may be confined within the capacitor 920.

As shown in FIG. 9, the resonator 900 may have a generally 3D structure. The transmission line may include the first signal conducting portion 911 and the second signal conducting portion 912 in an upper portion of the resonator 900, and may include the ground conducting portion 913 in a lower portion of the resonator 900. The first signal conducting portion 911 and the second signal conducting portion 912 may be disposed to face the ground conducting portion 913. In this arrangement, current may flow in an x direction through the first signal conducting portion 911 and the second signal conducting portion 912. Due to the current, a magnetic field H(W) may be formed in a −y direction. However, it will be appreciated that, the magnetic field H(W) might also be formed in the opposite direction (e.g., a +y direction) in other implementations.

In one or more embodiments, one end of the first signal conducting portion 911 may be electrically connected (i.e., shorted) to a conductor 942, and another end of the first signal conducting portion 911 may be connected to the capacitor 920. One end of the second signal conducting portion 912 may be grounded to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other, whereby the resonator 900 may have an electrically closed-loop structure. As shown in FIG. 9, the capacitor 920 may be inserted or otherwise positioned between the first signal conducting portion 911 and the second signal conducting portion 912. For example, the capacitor 920 may be inserted into a space between the first signal conducting portion 911 and the second signal conducting portion 912. The capacitor 920 may include, for example, a lumped element, a distributed element, or the like. In one implementation, a distributed capacitor having the shape of the distributed element may include zigzagged conductor lines and a dielectric material having a relatively high permittivity positioned between the zigzagged conductor lines.

When the capacitor 920 is inserted into the transmission line, the resonator 900 may have a property of a metamaterial, in some instances, as discussed above.

For example, when a capacitance of the capacitor inserted is a lumped element, the resonator 900 may have the characteristic of the metamaterial. When the resonator 900 has a negative magnetic permeability by appropriately adjusting the capacitance of the capacitor 920, the resonator 900 may also be referred to as an MNG resonator. Various criteria may be applied to determine the capacitance of the capacitor 920. For example, the various criteria may include, for instance, one or more of the following: a criterion for enabling the resonator 900 to have the characteristic of the metamaterial, a criterion for enabling the resonator 900 to have a negative magnetic permeability in a target frequency, a criterion enabling the resonator 900 to have a zeroth order resonance characteristic in the target frequency, or the like. Based on at least one criterion among the aforementioned criteria, the capacitance of the capacitor 920 may be determined.

The resonator 900, also referred to as the MNG resonator 900, may have a zeroth order resonance characteristic (i.e., having, as a resonance frequency, a frequency when a propagation constant is "0"). If the resonator 900 has a zeroth order resonance characteristic, the resonance frequency may be independent with respect to a physical size of the MNG resonator 900. Thus, by appropriately designing the capacitor 920, the MNG resonator 900 may sufficiently change the resonance frequency without substantially changing the physical size of the MNG resonator 900.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. And, since the MNG resonator 900 having the zeroth-order resonance characteristic may have characteristics similar to a magnetic dipole, the magnetic field may become dominant in the near field. A relatively small amount of the electric field formed due to the insertion of the capacitor 920 may be concentrated on the capacitor 920 and thus, the magnetic field may become further dominant.

Also, the MNG resonator 900 may include a matcher 930 for impedance-matching. The matcher 930 may be configured to appropriately adjust the strength of magnetic field of the MNG resonator 900. The impedance of the MNG resonator 900 may be determined by the matcher 930. In one or more embodiments, current may flow in the MNG resonator 900 via a connector 940, or may flow out from the MNG resonator 900 via the connector 940. And the connector 940 may be connected to the ground conducting portion 913 or the matcher 930.

As shown in FIG. 9, the matcher 930 may be positioned within the loop formed by the loop structure of the resonator 900. The matcher 930 may be configured to adjust the impedance of the resonator 900 by changing the physical shape of the matcher 930. For example, the matcher 930 may include the conductor 931 for the impedance-matching in a location separate from the ground conducting portion 913 by a distance h. The impedance of the resonator 900 may be changed by adjusting the distance h.

In some implementations, a controller may be provided to control the matcher 930. In this case, the matcher 930 may change the physical shape of the matcher 930 based on a control signal generated by the controller. For example, the distance h between the conductor 931 of the matcher 930 and the ground conducting portion 913 may be increased or decreased based on the control signal. Accordingly, the physical shape of the matcher 930 may be changed such that the impedance of the resonator 900 may be adjusted. The distance h between the conductor 931 of the matcher 930 and the ground conducting portion 913 may be adjusted using a variety of schemes. For example, a plurality of conductors may be included in the matcher 930 and the distance h may be adjusted by adaptively activating one of the conductors. Alternatively or additionally, the distance h may be adjusted by adjusting the physical location of the conductor 931 up and down. For instance, the distance h may be controlled based on the control signal of the controller. The controller may generate the control signal using various factors. As shown in FIG. 9, the matcher 930 may be configured as a passive element such as the conductor 931, for instance. Of course, in other embodiments, the matcher 930 may be configured as an active element such as, for example, a diode, a transistor, or the like. When the active element is included in the matcher 930, the active element may be driven based on the control signal generated by the controller, and the impedance of the resonator 900 may be adjusted based on the control signal. For example, if the active element is a diode included in the matcher 930, the impedance of the resonator 900 may be adjusted depending on whether the diode is in an ON state or in an OFF state.

In some implementations, a magnetic core may be further provided to pass through the resonator 900 configured as the MNG resonator. The magnetic core may perform a function of increasing a power transmission distance.

Figure 10:
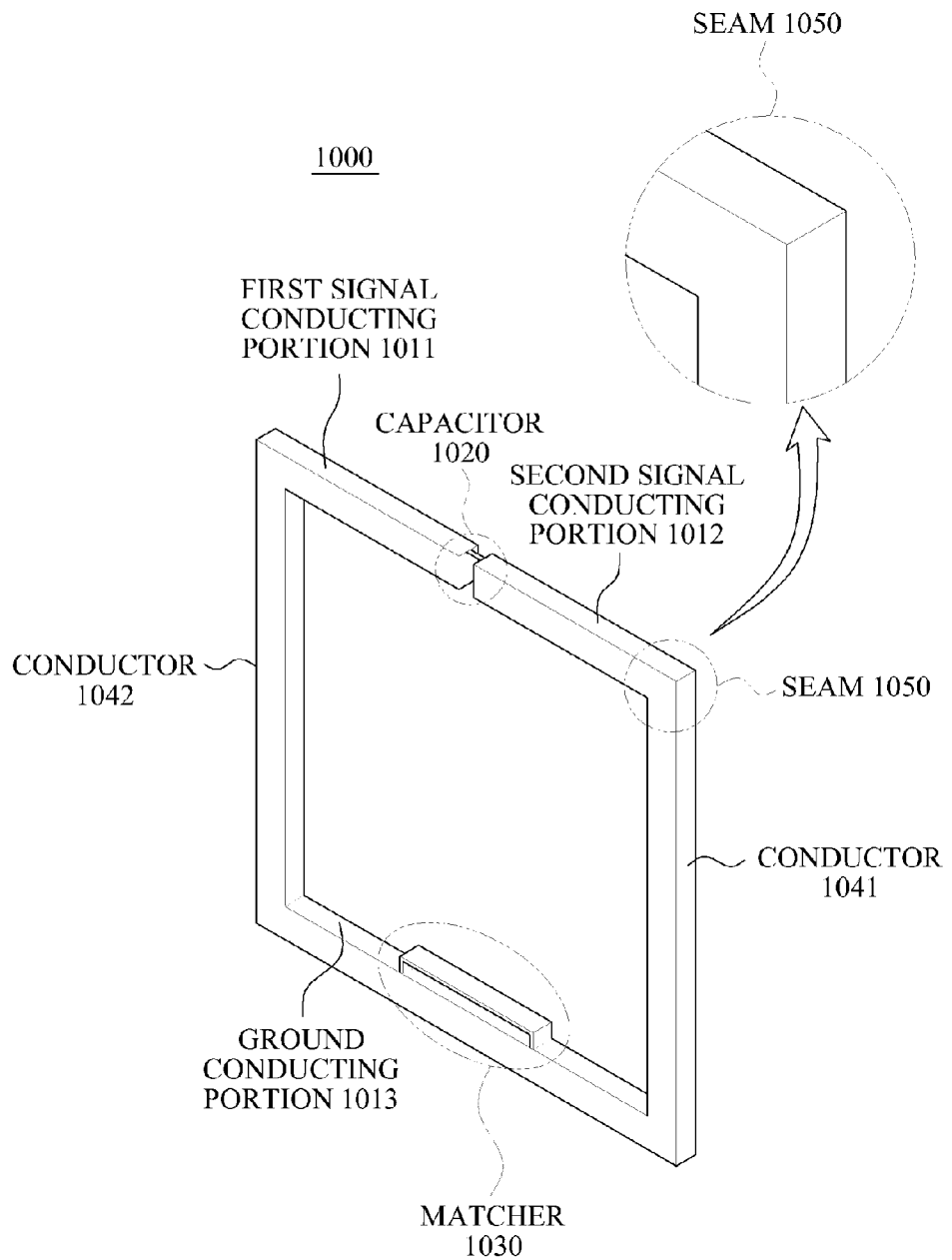

FIG. 10 illustrates a resonator 1000 for a wireless power transmission configured as a bulky type.

As used herein, the term "bulky type" may refer to a seamless connection connecting at least two parts in an integrated form.

Referring to FIG. 10, a first signal conducting portion 1011 and a conductor 1042 may be integrally formed instead of being separately manufactured and thereby be connected to each other. Similarly, the second signal conducting portion 1012 and a conductor 1041 may also be integrally manufactured.

When the second signal conducting portion 1012 and the conductor 1041 are separately manufactured and then are connected to each other, a loss of conduction may occur due to a seam 1050. Thus, in some implementations, the second signal conducting portion 1012 and the conductor 1041 may be connected to each other without using a separate seam, (i.e., seamlessly connected to each other). Accordingly, it is possible to decrease a conductor loss caused by the seam 1050. For instance, the second signal conducting portion 1012 and a ground conducting portion 1013 may be seamlessly and integrally manufactured. Similarly, the first signal conducting portion 1011, the conductor 1042 and the ground conducting portion 1013 may be seamlessly and integrally manufactured.

A matcher 1030 may be provided that is similarly constructed as described herein in one or more embodiments.

Figure 11:
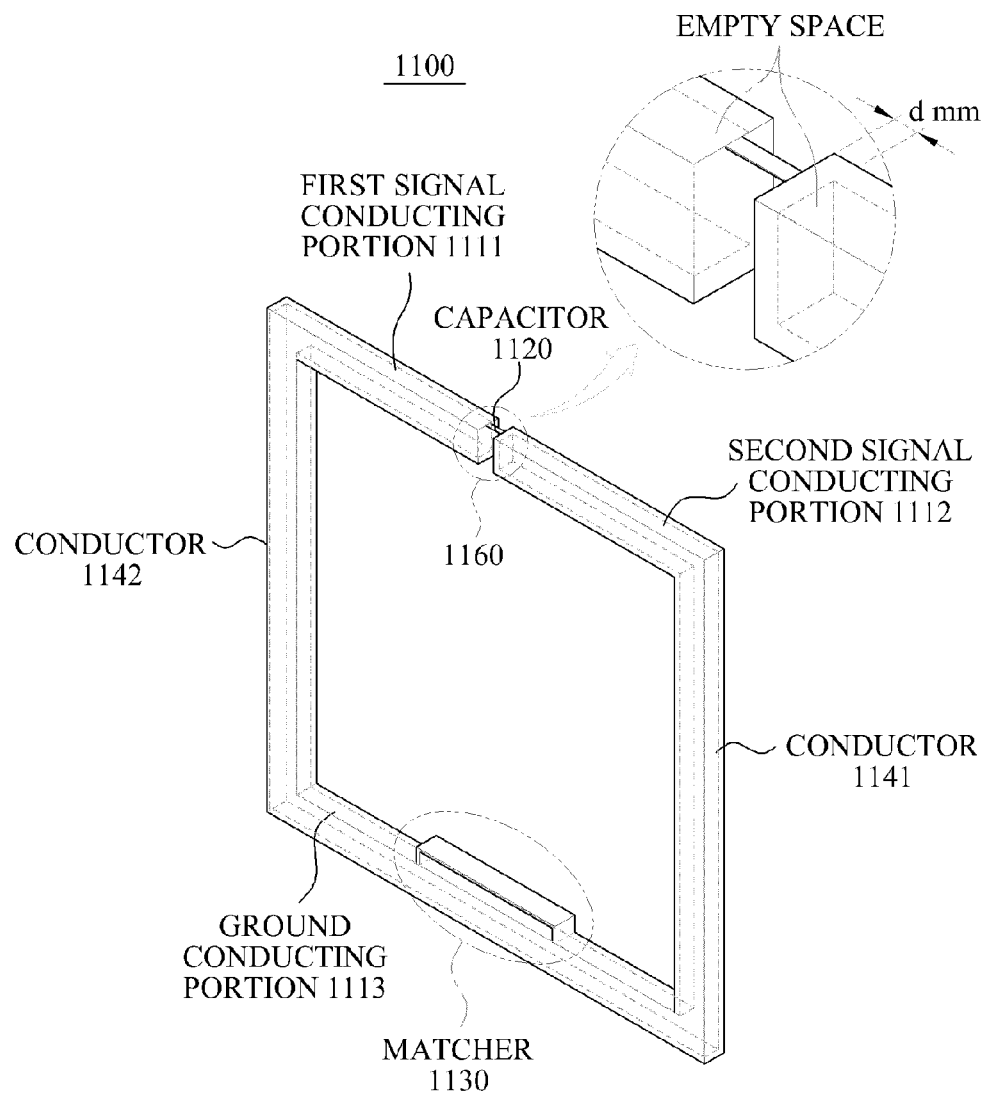

FIG. 11 illustrates a resonator 1100 for a wireless power transmission, configured as a hollow type.

Referring to FIG. 11, each of a first signal conducting portion 1111, a second signal conducting portion 1112, a ground conducting portion 1113, and conductors 1141 and 1142 of the resonator 1100 configured as the hollow type structure. As used herein the term "hollow type" refers to a configuration that may include an empty space inside.

For a given resonance frequency, an active current may be modeled to flow in only a portion of the first signal conducting portion 1111 instead of all of the first signal conducting portion 1111, the second signal conducting portion 1112 instead of all of the second signal conducting portion 1112, the ground conducting portion 1113 instead of all of the ground conducting portion 1113, and the conductors 1141 and 1142 instead of all of the conductors 1141 and 1142. When a depth of each of the first signal conducting portion 1111, the second signal conducting portion 1112, the ground conducting portion 1113, and the conductors 1141 and 1142 is significantly deeper than a corresponding skin depth in the given resonance frequency, it may be ineffective. The significantly deeper depth may, however, increase a weight or manufacturing costs of the resonator 1100 in some instances.

Accordingly, for the given resonance frequency, the depth of each of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142. When each of the first signal conducting portion 1111, the second signal conducting portion 1112, the ground conducting portion 1113, and the conductors 1141 and 1142 has an appropriate depth deeper than a corresponding skin depth, the resonator 1100 may become light, and manufacturing costs of the resonator 1100 may also decrease.

For example, as shown in FIG. 11, the depth of the second signal conducting portion 1112 (as further illustrated in the enlarged view region 1160 indicated by a circle) may be determined as "d" mm and d may be determined according to $$d = \frac{1}{\sqrt{\pi f \mu \sigma}}.$$

Here, f denotes a frequency, $\mu$ denotes a magnetic permeability, and $\sigma$ denotes a conductor constant. In one implementation, when the first signal conducting portion 1111, the second signal conducting portion 1112, the ground conducting portion 1113, and the conductors 1141 and 1142 are made of a copper and they may have a conductivity of $5.8 \times 10^7$ siemens per meter ($S \cdot m^{-1}$), the skin depth may be about 0.6 mm with respect to 10 kHz of the resonance frequency and the skin depth may be about 0.006 mm with respect to 100 MHz of the resonance frequency.

A capacitor 1120 and a matcher 1130 may be provided that are similarly constructed as described herein in one or more embodiments.

Figure 12:
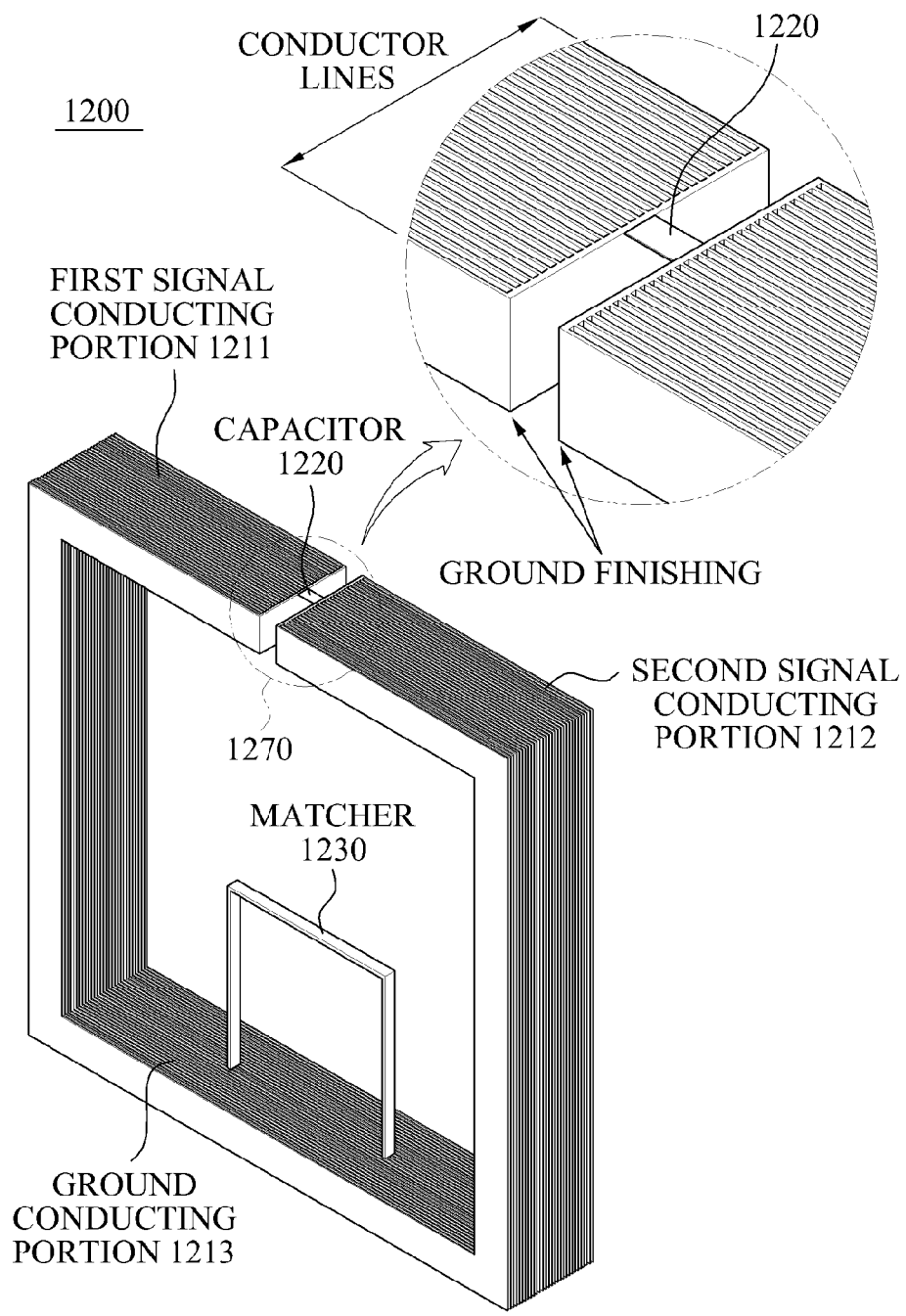

FIG. 12 illustrates a resonator 1200 for a wireless power transmission using a parallel-sheet.

Referring to FIG. 12, the parallel-sheet may be applicable to each of a first signal conducting portion 1211 and a second signal conducting portion 1212 included in the resonator 1200.

Each of the first signal conducting portion 1211 and the second signal conducting portion 1212 may not be a perfect conductor and thus, may have an inherent resistance. Due to this resistance, an ohmic loss may occur. The ohmic loss may decrease a Q-factor and also decrease a coupling effect.

By applying the parallel-sheet to each of the first signal conducting portion 1211 and the second signal conducting portion 1212, it may be possible to decrease the ohmic loss, and to increase the Q-factor and the coupling effect. Referring to the enlarged view portion 1270 indicated by a circle, when the parallel-sheet is applied, each of the first signal conducting portion 1211 and the second signal conducting portion 1212 may include a plurality of conductor lines. The plurality of conductor lines may be disposed in parallel, and may be electrically connected (i.e., shorted) at an end portion of each of the first signal conducting portion 1211 and the second signal conducting portion 1212.

When the parallel-sheet is applied to each of the first signal conducting portion 1211 and the second signal conducting portion 1212, the plurality of conductor lines may be disposed in parallel. Accordingly, a sum of resistances having the conductor lines may decrease. Consequently, the resistance loss may decrease, and the Q-factor and the coupling effect may increase.

A capacitor 1220 and a matcher 1230 positioned on the ground conducting portion 1213 may be provided that are similarly constructed as described herein in one or more embodiments.

FIG. 13 illustrates a resonator 1300 for a wireless power transmission, including a distributed capacitor.

Referring to FIG. 13, a capacitor 1320 included in the resonator 1300 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1320 as a distributed element, it may be possible to decrease the ESR. As will be appreciated, a loss caused by the ESR may decrease a Q-factor and a coupling effect.

As shown in FIG. 13, the capacitor 1320 may be configured as a conductive line having the zigzagged structure.

By employing the capacitor 1320 as the distributed element, it may be possible to decrease the loss occurring due to the ESR in some instances. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 14A:
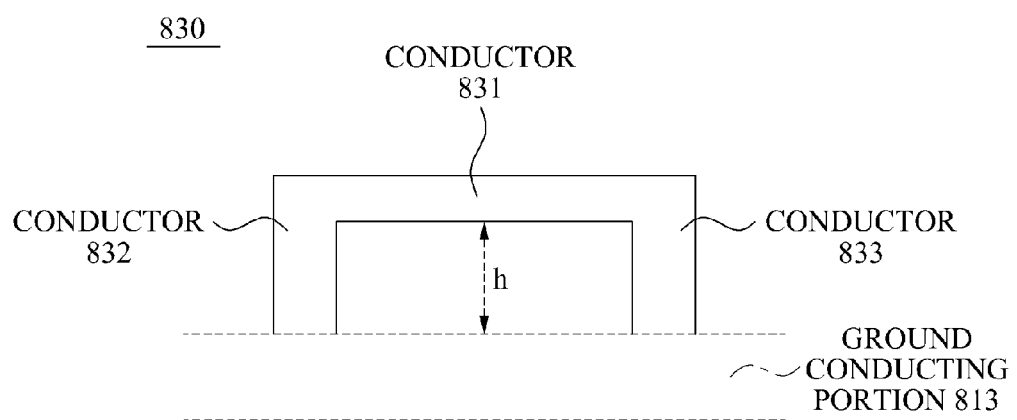
Figure 14B:
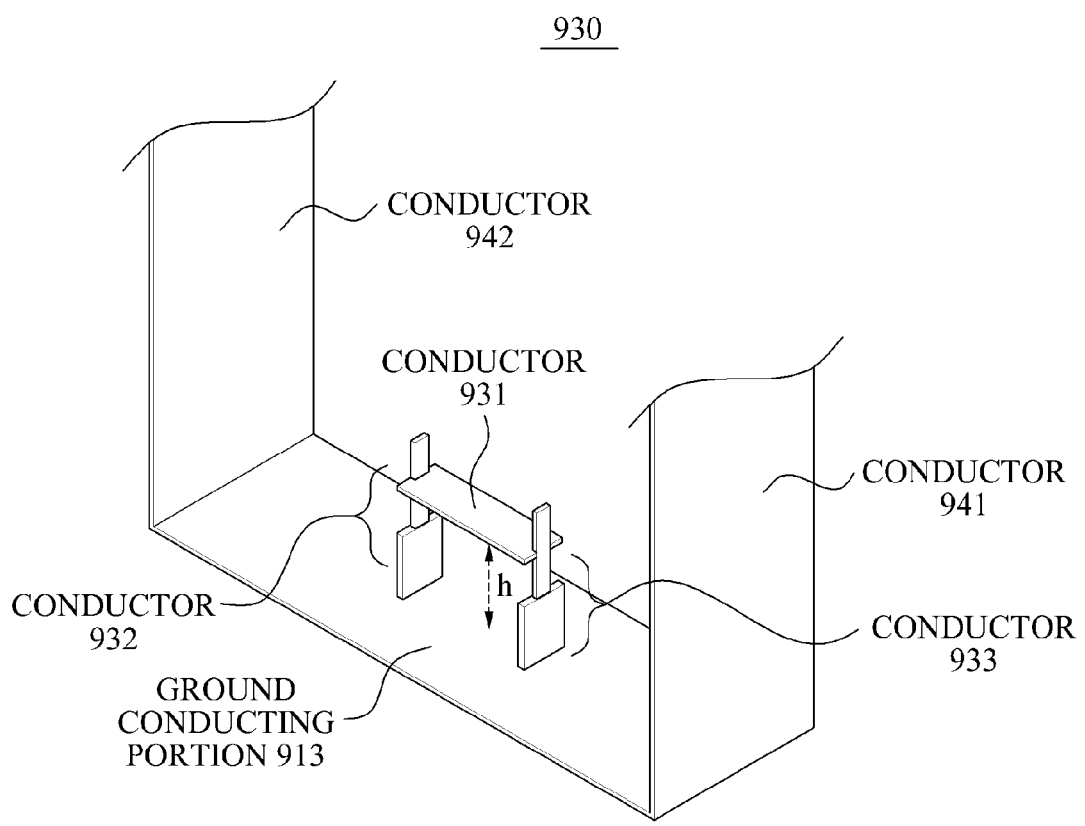

FIG. 14A illustrates the matcher 830 used in the resonator 800 provided in the 2D structure of FIG. 8, and FIG. 14B illustrates an example of the matcher 930 used in the resonator 900 provided in the 3D structure of FIG. 9.

FIG. 14A illustrates a portion of the 2D resonator including the matcher 830, and FIG. 14B illustrates a portion of the 3D resonator of FIG. 9 including the matcher 930.

Referring to FIG. 14A, the matcher 830 may include the conductor 831, a conductor 832, and a conductor 833. The conductors 832 and 833 may be connected to the ground conducting portion 813 and the conductor 831. The impedance of the 2D resonator may be determined based on a distance h between the conductor 831 and the ground conducting portion 813. The distance h between the conductor 831 and the ground conducting portion 813 may be controlled by the controller. The distance h between the conductor 831 and the ground conducting portion 813 can be adjusted using a variety of schemes. For example, the variety of schemes may include, for instance, one or more of the following: a scheme of adjusting the distance h by adaptively activating one of the conductors 831, 832, and 833, a scheme of adjusting the physical location of the conductor 831 up and down, or the like.

Referring to FIG. 14B, the matcher 930 may include the conductor 931, a conductor 932, a conductor 933 and conductors 941 and 942. The conductors 932 and 933 may be connected to the ground conducting portion 913 and the conductor 931. Also, the conductors 941 and 942 may be connected to the ground conducting portion 913. The impedance of the 3D resonator may be determined based on a distance h between the conductor 931 and the ground conducting portion 913. The distance h between the conductor 931 and the ground conducting portion 913 may be controlled by the controller, for example. Similar to the matcher 830 included in the 2D structured resonator, in the matcher 930 included in the 3D structured resonator, the distance h between the conductor 931 and the ground conducting portion 913 may be adjusted using a variety of schemes. For example, the variety of schemes may include, for instance, one or more of the following: a scheme of adjusting the distance h by adaptively activating one of the conductors 931, 932, and 933, a scheme of adjusting the physical location of the conductor 931 up and down, or the like.

In some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 15:
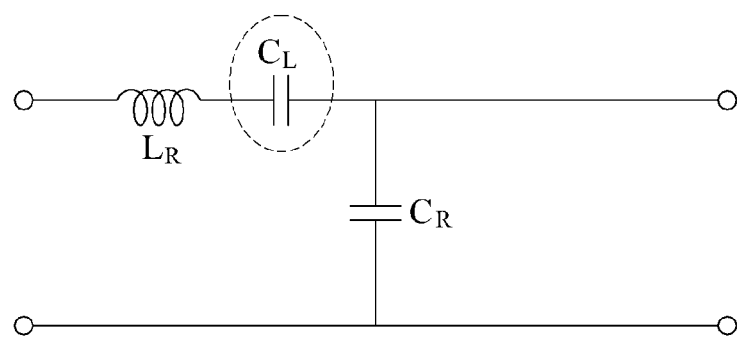
FIG. 15 is a circuit diagram illustrating one equivalent circuit of the resonator illustrated in FIG. 8.

FIG. 15 illustrates one equivalent circuit of the resonator 800 for the wireless power transmission of FIG. 8.

The resonator 800 of FIG. 8 *for* the wireless power transmission may be modeled to the equivalent circuit of FIG. 15. In the equivalent circuit depicted in FIG. 15, $L_R$ denotes an inductance of the power transmission line, $C_L$ denotes the capacitor 820 that is inserted in a form of a lumped element in the middle of the power transmission line, and $C_R$ denotes a capacitance between the power transmissions and/or ground of FIG. 8.

In some instances, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 1.

$$\omega_{MZR} = \frac{1}{\sqrt{L_R C_L}} \qquad \text{[Equation 1]}$$

In Equation 1, MZR denotes a Mu zero resonator.

Referring to Equation 1, the resonance frequency $\omega_{MZR}$ of the resonator 800 may be determined by $L_R/C_L$. A physical size of the resonator 800 and the resonance frequency $\omega_{MZR}$ may be independent with respect to each other. Since the physical sizes are independent with respect to each other, the physical size of the resonator 800 may be sufficiently reduced.

Example embodiments may perform wireless power transmission based on a time division scheme to effectively transmit power to a plurality of electronic devices.

Example embodiments may provide constant power regardless of changed in a load, when wirelessly transmitting power to a plurality of electronic devices.

Example embodiments may minimize a power loss during wireless transmission of power to a plurality of electronic devices.

One or more of the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power receiver comprising:
a target communication unit configured to receive, from a wireless power transmitter, a wake-up request signal and synchronization information of wireless power transmission, and transmit, to the wireless power transmitter, a response signal to the wake-up request signal to the wireless power transmitter;
a load path switch configured to activate based on timing information of the wireless power receiver that is included in the synchronization information, wherein the timing information is determined based on a charge level of the wireless power receiver; and
a target resonator configured to receive wireless power from a source resonator of the wireless power transmitter, in response to the load path switch being activated.

2. The wireless power receiver of claim 1, wherein the response signal includes identification information of the wireless power receiver and information of the charge level.

3. The wireless power receiver of claim 1, further comprising:
a matching controller configured to perform an impedance matching between the target resonator and the load or between the source resonator and the target resonator.

4. The wireless power receiver of claim 1, further comprising:
a resonance switch between the target resonator and the power supply and configured to activate based on the timing information included in the synchronization information.

5. The wireless power receiver of claim 1, further comprising:
a controller configured to calculate a power transmission efficiency of power wirelessly received from the wireless power transmitter, and transmit the power transmission efficiency to the wireless power transmitter via the target communication unit.

6. The wireless power receiver of claim 1, wherein:
the timing information included in the synchronization information has information of timing sections allocated to each of wireless power receivers; and
the timing sections are dynamically allocated based on a charge level of each of the respective wireless power receivers or based on a power transmission efficiency of each of the respective wireless power receivers.

7. The wireless power receiver of claim 1, wherein the timing information included in the synchronization information has information of timing sections allocated to each of wireless power receivers.

8. The wireless power receiver of claim 7, wherein a timing section of a receiver having a higher power transmission efficiency is longer than a timing section of a receiver having a lower power transmission efficiency.

9. The wireless power receiver of claim 7, wherein a timing section of a receiver having a lower charge level is longer than a timing section of a receiver having a higher charge level.

10. A wireless power transmitter comprising:
a source communication unit configured to transmit, to wireless power receivers, a wake-up request signal and synchronization information of wireless power transmission having timing information of the wireless power receivers, and receive, from the wireless power receivers, response signals to the wake-up request signal, wherein the timing information is determined based on a charge level of the wireless power receiver;
a power generating unit configured to generate power to be transmitted to the wireless power receivers; and
a source resonator configured to wirelessly transmit the generated power to a target resonator of each of the wireless power receivers.

11. The wireless power transmitter of claim 10, further comprising:
a controller configured to recognize a number of the wireless power receivers based on identification information included in each of the response signals, and generate the synchronization information based on the number of the wireless power receivers.

12. The wireless power transmitter of claim 11, wherein the controller is configured to monitor a power transmission efficiency of the wirelessly transmitted power, and adjust a resonance frequency of the source resonator based on a result of the monitored power transmission efficiency.

13. The wireless power transmitter of claim 10, further comprising:
a matching controller configured to perform an impedance matching between the source resonator and the power generating unit.

14. The wireless power transmitter of claim 10, wherein:
the timing information included in the synchronization information has information of timing sections allocated to each of the wireless power receivers; and
the timing sections are dynamically allocated based on a charge level of each of the respective wireless power receivers or based on a power transmission efficiency of each of the respective wireless power receivers.

15. The wireless power transmitter of claim 10, wherein the power generating unit is configured to generate power using a resonance frequency having an optimal transmission efficiency, and the generated power varies in each of the timing sections.

16. A wireless power reception controlling method of a wireless power receiver, the method comprising:
receiving a wake-up request signal from a wireless power transmitter;
transmitting, to the wireless power transmitter, a response signal to the wake-up request signal;
receiving, from the wireless power transmitter, synchronization information of wireless power transmission; and
switching a connection to a load or a target resonator, based on timing information of the wireless power receiver that is included in the synchronization information, wherein the timing information is determined based on a charge level of the wireless power receiver.

17. The method of claim 16, wherein the response signal includes identification information of the wireless power receiver and information of the charge level.

18. The method of claim 16, further comprising:
detecting a reflected wave or a change in an impedance of the load, and
controlling a resonance frequency or an impedance matching.

19. The method of claim 16, wherein:
the timing information included in the synchronization information timing sections is allocated to each of wireless power receivers; and
the timing sections are dynamically allocated based on a charge level of each of the respective power receivers or based on a power transmission efficiency of each of the respective wireless power receivers.

20. The method of claim 16, wherein the target resonator forms a magnetic coupling with a source resonator in response to the connection of the load or the target resonator being switched.

21. A wireless power transmission controlling method of a wireless power transmitter, the method comprising:
broadcasting a wake-up request signal;
receiving, from wireless power receivers, response signals to the broadcasted wake-up request signal;
generating synchronization information having timing information of the wireless power receivers to be used to wirelessly transmit power to the wireless power receivers;
broadcasting the synchronization information; and
forming, based on the timing information included in the synchronization information, a wireless connection with a target resonator of each of the wireless power receivers, and wirelessly transmitting power to the target resonator of each of the wireless power receivers, wherein the timing information is determined based on a charge level of the wireless power receiver.

22. The method of claim 21, wherein the generating of the synchronization information comprises:
determining a number of the wireless power receivers based on identification information included in each of the response signals, and
generating the synchronization information based on the number of the wireless power receivers.

23. The method of claim 21, wherein:
the timing information included in the synchronization information has information of timing sections allocated to each of the wireless power receivers; and
the timing sections are dynamically allocated based on a charge level of each of the wireless power receivers or based on a power transmission efficiency of each of the wireless power receivers.

24. The method of claim 21, wherein the timing information included in the synchronization information is transmitted to each of the wireless power receivers based on a duty cycle time.

25. The method of claim 24, wherein the duty cycle time comprises: a power duty, a phase duty, or a frequency duty.

26. A wireless power reception method comprising:
receiving a signal from a wireless power transmitter;
transmitting, to the wireless power transmitter, a response signal to the received signal; and
receiving, from the wireless power transmitter, synchronization information having timing information of a wireless power receiver to be used for wireless power reception, wherein the timing information is determined based on a charge level of the wireless power receiver.

27. The method of claim 26, further comprising:
switching a wireless connection to a load or a target resonator, based on the synchronization information.

28. The method of claim 26, wherein the response signal includes identification information of the wireless power receiver, information associated with the charge level, or both.

* * * * *